(12) United States Patent
Ewan et al.

(10) Patent No.: US 12,729,814 B2
(45) Date of Patent: Sep. 8, 2026

(54) HYDROGEN TRANSPORT, DISTRIBUTION AND STORAGE SYSTEM, METHOD AND APPARATUS

(71) Applicant: H2C Safety Pipe, Inc., Santa Barbara, CA (US)

(72) Inventors: James M. Ewan, Kaneohe, HI (US); Robert H. Shelton, Santa Barbara, CA (US); Rinaldo S. Brutoco, Santa Barbara, CA (US)

(73) Assignee: H2C SAFETY PIPE, INC., Santa Barbara, CA (US)

( * ) Notice: Subject to any disclaimer, the term of this patent is extended or adjusted under 35 U.S.C. 154(b) by 864 days.

(21) Appl. No.: 17/830,486

(22) Filed: Jun. 2, 2022

(65) Prior Publication Data

US 2022/0307652 A1 Sep. 29, 2022

Related U.S. Application Data

(60) Continuation of application No. 17/529,801, filed on Nov. 18, 2021, now Pat. No. 11,441,737, which is a (Continued)

(51) Int. Cl.
*F17C 11/00* (2006.01)
*C25B 1/04* (2021.01)
(Continued)

(52) U.S. Cl.
CPC .............. *F17C 11/005* (2013.01); *C25B 1/04* (2013.01); *C25B 9/65* (2021.01); *F16L 9/12* (2013.01);
(Continued)

(58) Field of Classification Search
CPC .............. F17C 11/005; F17C 2221/012; F17C 2221/033; F17C 2223/0123;
(Continued)

(56) References Cited

U.S. PATENT DOCUMENTS 1,435,555 A * 11/1922 Roberts .................. F16L 53/32 48/190
4,066,095 A 1/1978 Massa
(Continued)

FOREIGN PATENT DOCUMENTS

CN 1887622 A 1/2007
CN 101418907 A 4/2009
(Continued)

OTHER PUBLICATIONS

International Preliminary Report on Patentability in corresponding PCT application No. PCT/US2020/059786 dated May 11, 2023.
(Continued)

*Primary Examiner* — Minh Q Le
(74) *Attorney, Agent, or Firm* — Day Pitney LLP; John C. Serio

(57) ABSTRACT

A system uses existing pipelines, e.g., natural gas, oil, etc., to transport hydrogen to one or more distribution points. The disclosed hydrogen distribution system enables use of water, sewer, storm drain and other existing pipelines for local distribution. Hydrogen is produced from an energy source at a producing location. A safety pipe is located inside an existing pipeline configured to carry a first product and a hydrogen delivery line, configured to carry hydrogen, is placed inside the safety pipe such that a channel is formed between an exterior of the hydrogen delivery line and an interior of the safety pipe. Hydrogen is injected into the hydrogen delivery line and a sweeper gas is injected into the channel to purge any hydrogen that might be leaking from the hydrogen delivery line.

32 Claims, 10 Drawing Sheets

Related U.S. Application Data division of application No. 17/093,771, filed on Nov. 10, 2020, now Pat. No. 11,236,864.

(60) Provisional application No. 63/106,148, filed on Oct. 27, 2020.

(51) Int. Cl.

| | |
|---|---|
| ***C25B 9/65*** | (2021.01) |
| ***F16L 9/12*** | (2006.01) |
| ***F17C 5/06*** | (2006.01) |
| ***F17D 3/01*** | (2006.01) |
| ***F17D 3/18*** | (2006.01) |
| ***F17D 5/06*** | (2006.01) |
| *B64B 1/00* | (2006.01) |
| *F17D 1/02* | (2006.01) |
| *F17D 1/04* | (2006.01) |

(52) U.S. Cl.

CPC .................. *F17C 5/06* (2013.01); *F17D 3/01* (2013.01); *F17D 3/18* (2013.01); *F17D 5/06* (2013.01); *B64B 1/00* (2013.01); *F17C 2221/012* (2013.01); *F17C 2221/033* (2013.01); *F17C 2223/0123* (2013.01); *F17C 2223/0161* (2013.01); *F17C 2270/0184* (2013.01); *F17D 1/02* (2013.01); *F17D 1/04* (2013.01); *Y02E 60/32* (2013.01); *Y02P 90/45* (2015.11)

(58) Field of Classification Search

CPC ...... F17C 2223/0161; F17C 2270/0184; F17D 1/04; F17D 3/01; F17D 3/18; F17D 5/06; F17D 1/02; C25B 9/65; C25B 1/04; F16L 9/12; B64B 1/00; Y02E 60/32; Y02P 90/45

USPC ............................................................ 48/190

See application file for complete search history.

(56) References Cited

U.S. PATENT DOCUMENTS

| | | | | |
|---|---|---|---|---|
| 4,213,476 | A | 7/1980 | Bresie et al. | |
| 4,272,042 | A | 6/1981 | Slater | |
| 4,365,404 | A * | 12/1982 | Castro | F16L 53/32 29/523 |
| 4,723,441 | A * | 2/1988 | Sweeney | F16L 23/167 73/49.1 |
| 5,375,457 | A | 12/1994 | Trapp | |
| 5,639,394 | A | 6/1997 | Conley | |
| 5,803,127 | A * | 9/1998 | Rains | F16L 7/00 138/148 |
| 5,931,184 | A * | 8/1999 | Armenia | A47L 15/421 285/123.1 |
| 6,004,639 | A | 12/1999 | Quigley | |
| 6,032,699 | A | 3/2000 | Cochran | |
| 6,108,967 | A | 8/2000 | Erickson | |
| 6,361,299 | B1 | 3/2002 | Quigley | |
| 6,896,222 | B2 | 5/2005 | Dossas et al. | |
| 7,870,874 | B2 | 1/2011 | Quigley | |
| 8,336,810 | B2 | 12/2012 | Brutoco | |
| 8,418,732 | B2 | 4/2013 | Cohen | |
| 8,820,621 | B2 | 9/2014 | Burke et al. | |
| 8,932,184 | B2 | 1/2015 | Redmond | |
| 9,102,391 | B2 | 8/2015 | Brutoco | |
| 9,278,807 | B2 | 3/2016 | Drenvich | |
| 9,316,228 | B2 | 4/2016 | Becker et al. | |
| 9,464,761 | B2 | 10/2016 | Nagura | |
| 9,493,223 | B2 | 11/2016 | Brutoco | |
| 9,494,261 | B2 * | 11/2016 | Pan | F16L 9/19 |
| 10,288,207 | B2 | 5/2019 | Littlestar et al. | |
| 10,436,667 | B2 | 10/2019 | Littlestar et al. | |
| 10,589,969 | B2 | 3/2020 | Brutoco | |
| 11,236,864 | B1 | 2/2022 | Ewan et al. | |
| 2003/0209282 | A1 | 11/2003 | Satou | |
| 2004/0003856 | A1 | 1/2004 | Quigley | |
| 2004/0084083 | A1 | 5/2004 | Pearson | |
| 2004/0112427 | A1 | 6/2004 | Klassen | |
| 2004/0126888 | A1 | 7/2004 | Puri | |
| 2005/0166666 | A1 * | 8/2005 | Tsukagoshi | G01M 3/283 73/49.1 |
| 2006/0180237 | A1 | 8/2006 | Hoke | |
| 2007/0012362 | A1 | 1/2007 | Thyroff | |
| 2007/0125441 | A1 | 6/2007 | Farese | |
| 2008/0121643 | A1 | 5/2008 | Blencoe et al. | |
| 2009/0313896 | A1 | 12/2009 | Glidewell | |
| 2010/0059528 | A1 | 3/2010 | Zhevago et al. | |
| 2010/0102164 | A1 | 4/2010 | Brutoco | |
| 2010/0193045 | A1 | 8/2010 | Xu | |
| 2011/0022337 | A1 | 1/2011 | Macron | |
| 2013/0030577 | A1 | 1/2013 | Jarrell et al. | |
| 2013/0213491 | A1 | 8/2013 | Adler et al. | |
| 2014/0174152 | A1 | 6/2014 | Gil | |
| 2014/0311622 | A1 | 10/2014 | Cohen | |
| 2015/0300907 | A1 * | 10/2015 | Giunta | G01H 1/00 702/39 |
| 2018/0112828 | A1 | 4/2018 | Bourgeois | |
| 2018/0274731 | A1 | 9/2018 | Ethridge | |
| 2019/0330033 | A1 | 10/2019 | Brutoco | |
| 2020/0095113 | A1 | 3/2020 | Crispel | |
| 2020/0156925 | A1 | 5/2020 | Hasegawa et al. | |
| 2020/0171945 | A1 | 6/2020 | McNicholas | |
| 2020/0208771 | A1 | 7/2020 | Kim | |
| 2021/0003253 | A1 | 1/2021 | Thieu | |
| 2021/0222832 | A1 | 7/2021 | Allidieres | |
| 2021/0293385 | A1 | 9/2021 | Francois | |
| 2021/0347276 | A1 | 11/2021 | Lu | |
| 2022/0003361 | A1 | 1/2022 | Bødker et al. | |
| 2022/0146048 | A1 | 5/2022 | Ewan | |
| 2022/0161183 | A1 | 5/2022 | Maehara | |
| 2022/0205591 | A1 | 6/2022 | Li | |
| 2022/0307652 | A1 | 9/2022 | Clipper | |
| 2022/0364680 | A1 | 11/2022 | Sinding | |
| 2022/0397239 | A1 | 12/2022 | Jorgenson et al. | |
| 2023/0119413 | A1 | 4/2023 | Handa | |
| 2023/0259088 | A1 | 8/2023 | Borup et al. | |

FOREIGN PATENT DOCUMENTS

| | | | |
|---|---|---|---|
| CN | 103314246 | A | 9/2013 |
| CN | 105546360 | A | 5/2016 |
| CN | 110552686 | A | 12/2019 |
| CN | 110657347 | A | 1/2020 |
| CN | 110822295 | A | 2/2020 |
| CN | 113642975 | A | 11/2021 |
| DE | 3833127 | A1 | 4/1990 |
| DE | 19501044 | A1 | 7/1996 |
| DE | 102010009796 | A1 | 9/2011 |
| DE | 102010061797 | A1 | 5/2012 |
| EP | 1524108 | B1 | 4/2005 |
| EP | 2569571 | B1 | 7/2017 |
| FR | 2955642 | A1 | 7/2011 |
| JP | 2005351651 | B2 | 12/2005 |
| JP | 2006138351 | A | 6/2006 |
| JP | 2010071570 | A | 4/2010 |
| JP | 4584675 | B2 | 11/2010 |
| KR | 10-2015-0056194 | A | 5/2015 |
| RU | 2140605 | C1 | 10/1999 |
| WO | 2012052125 | A1 | 4/2012 |
| WO | 2012098038 | A1 | 7/2012 |
| WO | 2024109998 | A1 | 5/2024 |

OTHER PUBLICATIONS

Office Action in corresponding JP application No. 2023-524961 dated Sep. 26, 2024.

Rawls et al. Lowering Costs of Hydrogen Pipelines through Use of Fiber Reinforced Polymers and Modern Steels. US Department of Energy, Office of Energy Efficiency and Renewable Energy. Sep. 27, 2017.

(56) References Cited

OTHER PUBLICATIONS

Extended European Search Report in corresponding EP application No. 20960190.5 dated Sep. 22, 2023.
Jeff St. John, "Green Hydrogen in Natural Gas Pipelines," Green Tech Media, Nov. 30, 2020 (https://tinyurl.com/y3ela2nf).
National Grid, "Our Plan: National Grid Net Zero by 2050," Sep. 2020 (https://tinyurl.com/y36jaxc6).
Christopher Findlay, "What's your purpose? Reusing gas infrastructure for hydrogen transportation," Sep. 11, 2020 (https://tinyurl.com/y5nmmgp7).
Peter Adam, et. al., "Hydrogen infrastructure—the pillar of energy transition," Seimens Energy, Gascade Gastransport, Nowega, 2020, pp. 4,7-21 (https://tinyurl.com/yyejnnpf).
Per S. Heggem, "Storage and transport of compressed hydrogen," International Workshop on Renewable Energy and Hydrogen Export, Mar. 23, 2015 (https://tinyurl.com/y4cxhlke).
Fiber Glass Systems, "Fiberspar Engineering Guide: Spoolable LinePipe," National Oilwell Varco brochure, Sep. 2020 (https://tinyurl.com/y6918h61).
Fiber Glass Systems, "Fiberspar LinePipe: Corrosion-resistant, cost-efficient fiberglass pipe," National Oilwell Varco brochure, 2017 (https://tinyurl.com/y4b6gtk2).
Barton Smith, et. al., "New Materials for Hydrogen Pipelines," 2005 DOE Hydrogen Program Review Report, May 23, 2005 (https://tinyurl.com/y26r8xnm).
Hydrogen and Fuel Cell Technologies Office, "Hydrogen Pipelines," DOE Office of Energy Efficiency & Renewable Energy, Viewed on line Dec. 2, 2020 (https://tinyurl.com/y8x800).
Dr. Thad Adams, "Evaluation of Natural Gas Pipeline Materials for Hydrogen Service," Savannah River National Laboratory, Jan. 5, 2005, pp. 15-19 (https://tinyurl.com/9wxfmvzt.
J.L. Gillette and R.L. Kolpa, "Overview of Interstate Hydrogen Pipeline Systems," Argonne National Laboratory, Nov. 2007 (https://tinyurl.com/y2shsxkp).
Thad Adams, et. al., "Evaluation of Natural Gas Pipeline Materials for Hydrogen/Mixed Hydrogen-Natural Gas Service," DOE Review Report, Nov. 2005 (https://tinyurl.com/y56qvh2y).
R. Davis Smith, et. al., "Interfacial Stability of Thin Film Fiber-Optic Hydrogen Sensors," 2002 U.S. DOE Hydrogen Program Review (https://tinyurl.com/yyrd3euw).
U.S. Department of Energy, "Department of Energy Hydrogen Program Plan," DOE/EE-2128, Nov. 2020, pp. 18-24, 44 (https://tinyurl.com/y64d2x4r).
U.S. Department of Energy, "Doe Technical Targets for Hydrogen Delivery," Accessed Dec. 2, 2020 (https://tinyurl.com/y49p5nf7).
U.S. Department of Energy, "Hydrogen and Fuel Cells Technologies Office Multi-Year RD&D Plan: Section 3.2 Hydrogen Delivery," Aug. 2015 (https://tinyurl.com/y4mt6nqa).
U.S. Department of Energy, "Hydrogen and Fuel Cells Technologies Office Multi-Year RD&D Plan: Section 3.3 Hydrogen Storage," May 2015 (https://tinyurl.com/y21bgg4z).
D.S. Mallapragada, et. al., "Can Industrial-Scale Hydrogen from Commodity Technologies Be Cost Competitive by 2030?," Cell Reports, Sep. 23, 2020 (https://tinyurl.com/y2ehgcqy).
SGN Natural Gas, "We're preparing to deliver the world's first 100% green hydrogen network," May 18, 2020 (https:// tinyurl.com/y4pasjw2).
SGN Natural Gas, "H100 Fife: Proposed hydrogen production, storage and demonstration facilities" (Illustration and Flex pipe image), Nov. 2020 (https://tinyurl.com/y6mt93zy).
SGN Natural (https://tinyurl.com/Gas, "SGN y3mr957f; H100 Fife Virtual https://tinyurl.com/y6f4enyp Exhibition Boards and 1-3," https://tinyur11-2020 I.com/y6on3a3j).
Energy Network Association, "Gas Goes Green: Delivering the Pathway to Net Zero," Mar. 2020 (https://tinyurl.com/y5efgqjp).
National Grid Group PLC, "Ofgem green-lights funding for net zero projects," Nov. 30, 2020 (https://tinyurl.com/y3dlbek6).
Cadent Gas Ltd., "HyMotion: Network-supplied hydrogen unlocks low carbon transport opportunities," Jun. 2019 (https://tinyurl.com/y25jx91w).
Sarah Deasley, et. al., "Hydrogen Blending and the Gas Commercial Framework," Frontier Economics Ltd., Sep. 2020 (https://tinyurl.com/y6rvbwev).
S. Bruce, et. al., "National Hydrogen Roadmap," CSIRO (Australia), 2018, pp. xv-xvii, 26-34 and 88 (https://tinyurl.com/y2c7wb6z).
Mike Watson, Existing gas pipeline infrastructure could be key to future hydrogen refueling stations, Stuff (NZ Website) Nov. 17, 2020.
Michael Ball, et. al., "Large-Scale Hydrogen Delivery Infrastructure: Task 28 Final Report," Intl Energy Agency, Aug. 2015, pp. 32-36, 45-48, 52, 74.
International Energy Agency, "The Future of Hydrogen, IEA G20 Hydrogen report: Assumptions annex," Jun. 14, 2019, pp. 7-8 (https://tinyurl.com/y6oxtb 7b).
Joakim Andersson, "Large-scale storage of hydrogen," Intl Journal of Hydrogen Energy, May 3, 2019, pp. 11902-11904 (https://tinyurl.com/y6gehbqu).
A. Gandolfi, et al., "Green Hydrogen: The next transformational driver of the Utilities industry," Golden sachs, 100-03-2020, pp. 34-37, 55-56.
Fuel Cell Works, "Tenaris Partners with Nel Hydrogen for CA Hydrogen Truck Refueling Network," Nov. 25, 2020.
The Hydrogen Strategy for Canada, Dec. 2020, pp. 39-42.
R.K. Ahluwalia, et al., "System Level Analysis of Hydrogen Storage Options," US DOE Hydrogen and Fuel Cells Program, May 19, 2020, pp. 6, 13 & 25.
R.K. Ahluwalia, et al., "System Level Analysis of Hydrogen Storage Options," US DOE Hydrogen and Fuel Cells Program, Apr. 29, 2019, pp. 6-7 & 12-21.
W.J. Brown, et al. "Safety Standard for Hydrogen and Hydrogen Systems," NASA, Feb. 12, 1997, pp. 2-5; 2-6; 5-8, 5-10; 5-39 to 5-41; & 6-1 to 6-5.
S. Woods, et al. "Guide to Safety of Hydrogen and Hydrogen Systems," ANSI/AIAA, Dec. 11, 2017, pp. 51-52; 56-57;83,102;106-107;124-130;138-139;166-170.
Congressional Research Service, "Pipeline transportation of Hydrogen: Regulation, Research, and policy," Mar. 2, 2021, pp. 5-7, 12-17 &22-23.
Barton, Smith, et al., "Composites Technology for Hydrogen Pipelines," Oak Ridge and Savannah River National Labs, Sep. 25, 2007, pp. 3-7 & 10-17.
Nexant, "Final Report: Hydrogen Delivery Infrastructure Options Analysis" Mar. 2014, pp. 3-8, 15-29, 53-59, 64-67, 93-103, 134-139, 195-207 & 319-348.
International Search Report and Written Opinion in corresponding application No. PCT/2024/027928 dated Oct. 11, 2024.
Office Action in corresponding Korean application No. 10-2023-7017925 dated Dec. 10, 2024.
International Search Report and Written Opinion corresponding to Application No. PCT/US2025/050269, dated Feb. 11, 2026, 24 pages.

* cited by examiner

FIG. 1(a)

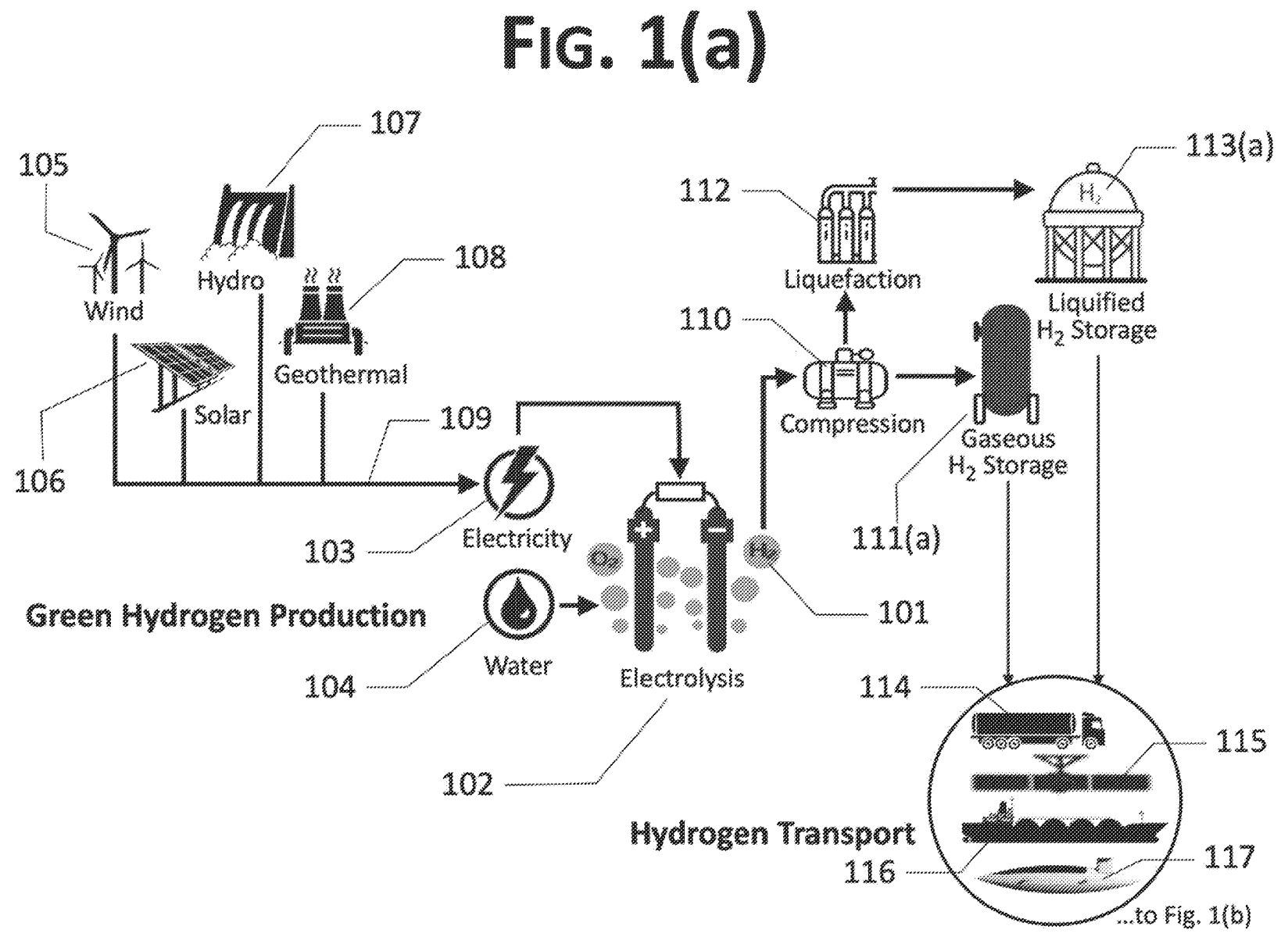

Green Hydrogen Production

Wind 105
Solar 106
Hydro 107
Geothermal 108
109
Electricity 103
Water 104
Electrolysis 102
101

Compression 110
Liquefaction 112
Gaseous $H_2$ Storage 111(a)
Liquified $H_2$ Storage 113(a)

Hydrogen Transport 114
115
116
117
...to Fig. 1(b)

...from Fig. 1(a)
114
115
116
117
Hydrogen Transport
113(b)
Liquified $H_2$ Storage
118
Vaporizer(s)
Gaseous $H_2$ Storage
111(b)
119(a)
119(c)
119(e)
Hydrogen Distribution
Hydrogen End Uses
120
Turbine Generator
121
Fuel Cell
122
Electrical Grid Services
119(b)
123
Fuel Cell
124
Residential Applications
125
Heating
126
Power
128
Fuel Cell
129
Power
119(d)
127
Industry Applications
131
130
$H_2$ Filling Station
132
Fuel Cell Vehicles
133
134
135

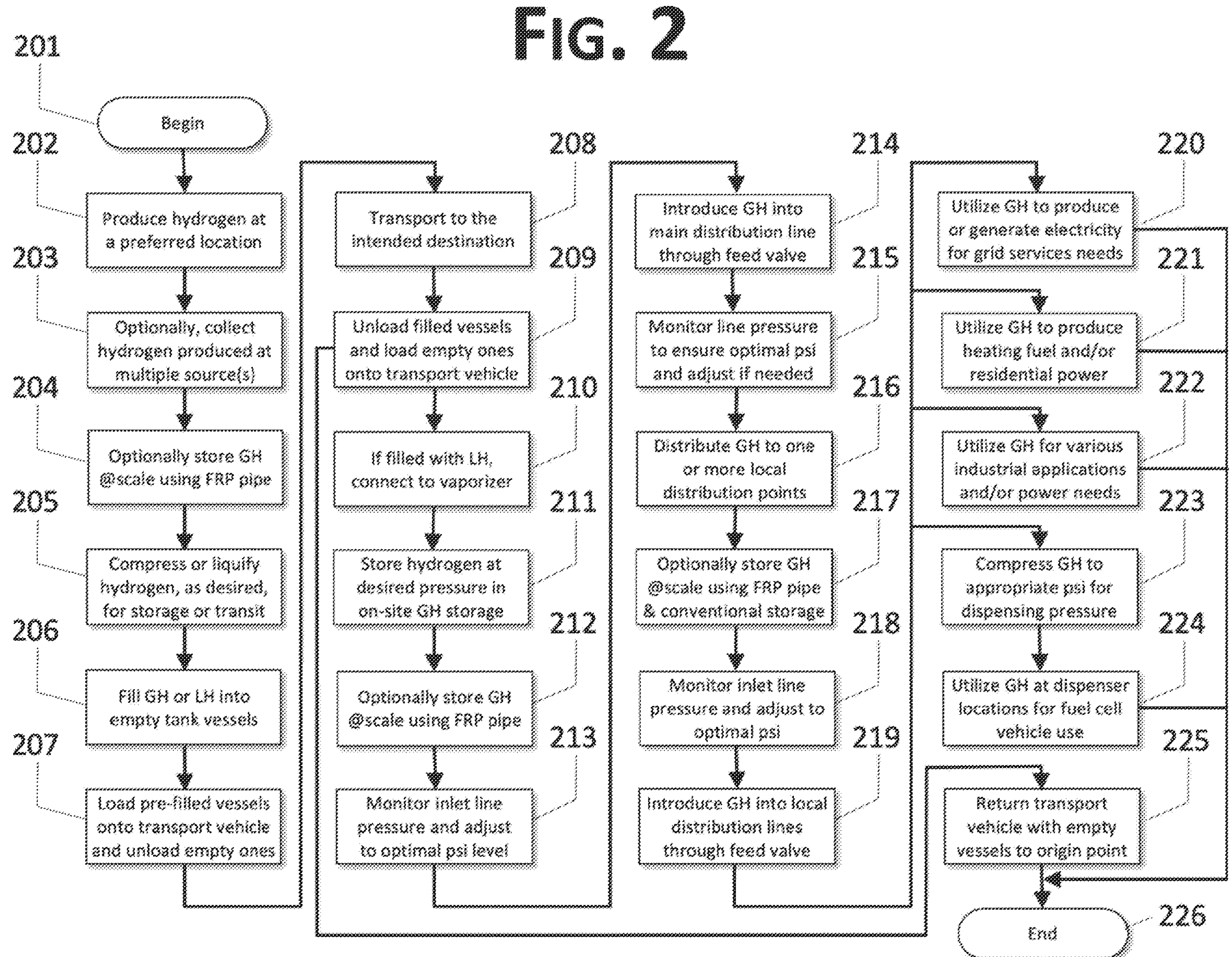
FIG. 2
201
Begin
202
Produce hydrogen at a preferred location
203
Optionally, collect hydrogen produced at multiple source(s)
204
Optionally store GH @scale using FRP pipe
205
Compress or liquify hydrogen, as desired, for storage or transit
206
Fill GH or LH into empty tank vessels
207
Load pre-filled vessels onto transport vehicle and unload empty ones
208
Transport to the intended destination
209
Unload filled vessels and load empty ones onto transport vehicle
210
If filled with LH, connect to vaporizer
211
Store hydrogen at desired pressure in on-site GH storage
212
Optionally store GH @scale using FRP pipe
213
Monitor inlet line pressure and adjust to optimal psi level
214
Introduce GH into main distribution line through feed valve
215
Monitor line pressure to ensure optimal psi and adjust if needed
216
Distribute GH to one or more local distribution points
217
Optionally store GH @scale using FRP pipe & conventional storage
218
Monitor inlet line pressure and adjust to optimal psi
219
Introduce GH into local distribution lines through feed valve
220
Utilize GH to produce or generate electricity for grid services needs
221
Utilize GH to produce heating fuel and/or residential power
222
Utilize GH for various industrial applications and/or power needs
223
Compress GH to appropriate psi for dispensing pressure
224
Utilize GH at dispenser locations for fuel cell vehicle use
225
Return transport vehicle with empty vessels to origin point
226
End A - A detail from FIG. 3(b)

B - B detail from FIG. 3(c)
317
325
316
308
309
307
101
315
314
323
324
$H_2$
101
318(a)
322(b)
330
318(c)
318(b)
322(a)
321
111
320
319

HYDROGEN TRANSPORT, DISTRIBUTION AND STORAGE SYSTEM, METHOD AND APPARATUS

CROSS REFERENCE TO RELATED APPLICATIONS

This application is a continuation of U.S. patent application Ser. No. 17/529,801 filed Nov. 18, 2021, now U.S. Pat. No. 11,441,737, entitled "Hydrogen Transport, Distribution And Storage System, Method And Apparatus," which claims priority to, and the benefit of, U.S. patent application Ser. No. 17/093,771 filed Nov. 10, 2020, now U.S. Pat. No. 11,236,864, entitled "Hydrogen Transport, Distribution And Storage System, Method And Apparatus," which in turn claims priority to, and the benefit of, U.S. Provisional Patent Application No. 63/106,148, filed on Oct. 27, 2020 entitled "Hydrogen Transport, Distribution And Storage System, Method And Apparatus," the contents of each which is incorporated herein by reference as though fully set forth herein.

FIELD OF THE TECHNOLOGY

The subject technology generally relates to the storage of energy at scale and the transport of hydrogen from wherever it is produced, to the locations where it is needed by end users and/or from which it can be distributed to such end users. While the subject technology may be used as a means for transporting hydrogen produced from any source, it is particularly useful for reducing the length of time, capital investment and complexity involved in securing requisite approvals, acquiring rights of way, installing, transporting and distributing "green" hydrogen from the locations where it can be produced most advantageously to a plurality of individual end use locations such as electric utility substations, commercial and industrial facilities, filling stations, and homes of consumers wishing to employ hydrogen as a clean, renewable energy source in lieu of fossil fuel. The subject technology also provides a method of storing energy that is lower in cost and has significantly greater energy retention compared to battery technology, and that affords a more cost-effective, more readily scaled and lower maintenance option for new hydrogen at scale infrastructure than storing hydrogen in traditional hydrogen storage tanks.

BACKGROUND OF THE TECHNOLOGY

On Sep. 23, 2020, Bank of America Global Research issued a Thematic Investing Report predicting that because the point of economically producing hydrogen from renewable energy sources is being reached, hydrogen is at a tipping point, with the potential to generate $2.5 trillion of direct revenues and $11 trillion of indirect infrastructure by 2050. Persons of ordinary skill in the art are aware that although the technology to produce hydrogen from water through a process known as "electrolysis" has been used for decades, broad systemic use of hydrogen as a replacement for fossil fuels or for electrical energy storage at scale has yet to reach an inflection point and achieve mainstream use. As the Bank of America report states, this situation is now changing due to: (1) the falling cost of renewable energy from wind and solar radiation; (2) the declining cost and improved efficiency of electrolyzer systems that can use such renewable energy to produce hydrogen from water, with pure oxygen as the only by-product; (3) improvements in the efficiency, durability, cost and flexibility of fuel cells that convert hydrogen back to electricity with clean water as the only by-product; (4) the expansion of potential end-markets for green hydrogen as a result of the global focus on decarbonization and sustainability; and (5) a legislated market for hydrogen as governments adopt increasingly aggressive clean energy policies and impose regulatory requirements to decarbonize the energy system including the electrical grid and transportation market sectors.

According to the report, "green" hydrogen (e.g., a term referring to hydrogen that is produced from renewable resources) could be a critical component in the fight against global warming, providing up to 24% of global energy requirements by 2050, and in the process cutting harmful emissions by up to 30%. Bank of America reasons that because it is the only clean molecule able to simultaneously satisfy our energy needs for transportation and generating electrical power, hydrogen will play a major role for the increasing number of countries and companies signing legally binding pledges to achieve net zero carbon emissions by 2050. Accordingly, a number of governments, notably including countries within the European Union, Canada, China and Australia, are starting to provide strong policy support including increased carbon prices and funding to develop hydrogen production capacity and associated infrastructure. Through its "H2@Scale" initiative and Energy Efficiency and Renewable Energy (EERE) Office, the U.S. Department of Energy (DOE) has also sought to accelerate hydrogen research, development, demonstration and implementation activities.

Effecting a worldwide transition to a "hydrogen economy" faces a number of practical technical, financial and logistic challenges. One of the longstanding challenges that has received relatively little attention involves developing new and improved means for transporting and distributing hydrogen from places where it is produced, to the locations where it is needed by the end user. Existing pipelines are ill-suited to being converted to hydrogen for a number of technical reasons including embrittlement of the pipe and valve materials. As authors Ulf Bossel, Baldur Eliasson and Gordon Taylor explain in their 2004 paper entitled, "*The Future of the Hydrogen Economy: Bright or Bleak*?," "most attention has been given to the apparent benefits of hydrogen in use, while the upstream aspects of a hydrogen economy are rarely addressed." These authors argue that upon adding the energy required to package, handle, store and transport hydrogen to the energy required to make it, the future energy economy "is unlikely to be based on elemental hydrogen."

The challenge stems from the fact that hydrogen's relatively low volumetric energy density makes its transport, storage and dispensing highly inefficient; and presently constitutes one of the most significant cost and energy inefficiencies to its use as an energy carrier. This problem is exacerbated by the fact that the locations where low-cost renewable energy sources naturally exist from which green hydrogen can be produced most economically frequently are remote and sparsely populated; and as a result, tend to be inversely correlated with locations that have the greatest need for clean-burning fuel.

Electricity prices comprise between 60% and 75% of the cost of green hydrogen. Accordingly, locations that have a natural source of high volumes of low-cost renewable energy capacity from solar radiation (such as equatorial desert regions), wind energy (such as mountain passes and island inlets), hydropower (such as near large bodies of water with significant elevation changes) and/or geothermal heat (such as near active volcanos or vents), enable hydrogen to be produced at a significantly lower cost per kilogram. However, these locations where high volume, low-cost renewable energy sources exist in nature are generally not proximate to industrial centers and large population density, making transportation costs a much more significant factor.

Hydrogen transportation and distribution costs can be minimized by locating production at or very close to the point of use. However, distributing production to the point of use results in higher production costs because economies of scale are lost; and dense population centers and areas with high commercial and industrial activity also commonly have higher power and land costs. Attempting to strike a balance between these extremes is also challenging. If hydrogen is produced centrally to take advantage of economies of scale, the longer transport distances can significantly increase delivery costs. And attempting to produce industrial quantities of hydrogen semi-centrally (closer to the point of use) to reduce transportation distances is frequently constrained by space limitations, safety and aesthetic concerns, as well as very little excess renewable energy capacity.

For these reasons, delivery costs are significant in all cases and must be minimized. Currently, hydrogen transport trailers and pipelines are the most commonly used options for delivering hydrogen from the point of production to where hydrogen is used. Under the former option, gaseous hydrogen is compressed from the relatively low pressure of 20-30 bar (290-435 psi) at which it is commonly produced by an electrolyzer, to 180 bar (~2,600 psi) or higher; and transported in long cylinders that are stacked on a trailer that a tractor, train or ship hauls. Hexagon Lincoln is a global leader in the manufacture of Type 4-rated carbon fiber cylinders that are 70% lighter than steel and produced in lengths up to its 40' long Titan® tanks that hold hydrogen at up to 950 bar (approximately 13,750 psi). Referred to by the company as a Mobile Pipeline®, such cylinders provide a ready solution for storing and transporting hydrogen to locations that are not on a grid, or where it is economically or logistically infeasible to build a pipeline. While practical in the short term, transporting hydrogen this way is labor-intensive, expensive and generally not extensible as a long-term replacement for the existing fossil fuel transmission and distribution infrastructure.

Although it is well known that gaseous hydrogen can be transported through pipelines much like natural gas is today, experts acknowledge that the high initial capital costs of new pipeline construction constitutes a major barrier to dramatically expanding the hydrogen pipeline delivery infrastructure. For this reason, researchers have focused on overcoming technical concerns including (1) the potential for hydrogen to embrittle the steel and welds used to fabricate existing steel pipelines; (2) the need to control hydrogen permeation and leaks; and (3) the need for lower cost, more reliable, and more durable hydrogen compression, liquification and storage technologies. The US Department of Energy's H2@Scale program and similar research efforts in other countries has focused on two potential solutions.

The first of these, which has been advanced by Oak Ridge National Laboratory (ORNL) and Savannah River National Laboratory (SRNL), involves the use of fiber reinforced polymer (FRP) pipelines such as Fiberspar LinePipe™, a spoolable product consisting of an inner thermoplastic pressure barrier reinforced by high-strength glass fibers embedded in an epoxy matrix that is manufactured by National Oilwell Varco (NOV). FRP pipe has the advantages of being available commercially through NOV and its competitors; and having been used extensively for many years in the oil and gas industry.

NOV estimates that over 80 million feet (more than 15,000 miles) of its Fiberspar LinePipe is used in oilfield service in a wide range of temperature and terrain-specific installations including laid on surface, buried in conventional open ditch, plowing and installed inside of failing steel pipeline for remediation purposes. Its FRP pipe is available in diameters of between 2" and 6", in continuous lengths up to 9,000 ft (2740 m) on reels for rapid installation. Based on testing that has been done by SRNL and ORNL, SRNL and the American Society of Mechanical Engineers (ASME) have codified FRP pipe up to 6" in diameter in ASME B31.12 ("Hydrogen Piping Code") for gaseous hydrogen transmission up to 2500 psi and a design life of 50 years.

Researchers estimate that use of FRP pipeline will result in a savings of about 20% versus steel pipe because it can be installed in much narrower rights of way and can be obtained in section lengths that are much longer than steel, thereby minimizing welding requirements, and avoiding the need for coatings or x-rays because the FRP pipeline is non-corrosive. According to estimates by ORNL, the total capital investment (in 2007 $) for an FRP hydrogen pipeline would be just under $600,000 per mile, including approximately $350,000 per mile for FRP pipeline, materials and installation; and $250,000 per mile for estimated right of way acquisition and permitting. The ORNL study notes this cost compares favorably to the capital investment estimate of $636,000 for a 16-inch steel pipeline.

The second alternative involving pipeline transport that researchers have viewed as a promising way to grow the hydrogen delivery infrastructure is to adapt the expansive natural gas transmission and distribution infrastructure to accommodate hydrogen. Stimulated by the EU's "Hydrogen Strategy for a Climate-Neutral Europe" in July 2020, and indications of interest by the G20, Germany and Japan in developing hydrogen technology, German pipeline operators Nowega and Gascade, together with Siemens Energy, prepared and released in October 2020 a comprehensive white paper studying practical aspects of converting natural gas pipelines as pillars of a future hydrogen-based energy transition. The firms' proposal contemplates converting existing natural gas pipelines and storage facilities to carry a blend of natural gas and hydrogen (up to about 20% hydrogen) based on research showing this can be achieved with only modest modifications to the pipeline, and without resulting in embrittlement of the pipe and/or valve materials. However, under this alternative, the hydrogen must be separated and purified at the point of extraction. In order to be efficiently used in fuel cells, the extracted hydrogen must have at least 99.9% purity; and recent modeling activities have identified significant costs associated with achieving this.

Applicant's prior patent application Ser. No. 12/290,453, filed on Oct. 29, 2008, now U.S. Pat. No. 8,336,810 (the '810 patent) describes the use of a lighter-than-air airship to transport hydrogen from locations where natural conditions enable it to be most economically produced to locations where there is a strong market demand. However, this earlier disclosure is limited to providing a means of transporting hydrogen to one or a few destination points and does not address challenges associated with widespread distribution and the like.

SUMMARY OF THE SUBJECT TECHNOLOGY

The subject technology overcomes these longstanding problems and limitations of the prior art, and provides a means involving less time, significantly lower capital cost, and far less complications associated with land use, right-of-way acquisition, permitting, construction and ongoing maintenance to transport hydrogen from the location where it is produced to the regions where it is most needed, its storage at scale, and its widespread distribution to end users across such market areas.

The subject technology provides a system, method and apparatus to cost-effectively transport, store and widely distribute hydrogen from locations where it is produced to where it is most needed. The subject technology overcomes many of the technological constraints involved in transporting, storing and distributing hydrogen, and materially reduces prohibitively high installation costs, delays, land-use and permitting barriers.

Many regions have invested heavily in natural gas and oil pipelines that span great distances; and all cities, most towns, and many rural communities throughout the world have invested heavily in water, sewer and storm drain systems. Collectively herein, all of these pipelines and systems, including those presently in use, those that may have been decommissioned and pipelines that have yet to be built, are referred to as "existing pipelines." Without limitation, as used herein, the term "existing pipelines" also includes underground utility lines, rail lines and tubes, including for future systems such as hyperloop. The land on which these existing pipelines are constructed has been acquired; rights-of-way and authorizing permits have been granted; and a huge investment has been made to excavate, install and maintain these existing pipeline systems. Many of these existing pipelines have ample capacity that enable them to also be used as hydrogen distribution pipelines with the ability to transport and distribute hydrogen at any level of purity.

The subject technology includes preparing a hydrogen distribution pipeline by inserting a "hydrogen delivery line" into one or more of these existing pipelines. Such hydrogen delivery line is made of a material such as (but not necessarily limited to) ASME codified FRP pipe to carry pressurized hydrogen, which is in turn contained inside a larger diameter pipe that provides a means of collecting any hydrogen that leaks from the hydrogen delivery line. A sweeper or inert gas or liquid, referred to herein as "purge gas" or "sweeper gas," is flowed on the outside of the hydrogen delivery line to remove any hydrogen that has leaked from such line. Such purge gas may be nitrogen, CO2, or the like; and depending on circumstances and individual operator preferences, in cases where a leak of hydrogen into the existing pipeline would not create a safety risk or an unacceptable level of contamination, the product flowing through such existing pipeline may itself be used in as such sweeper gas.

In other instances, where a potential leak of hydrogen into the contents of such existing pipeline would be unacceptable to the operator or could create a safety risk (such as when the existing pipeline carries water or contains ambient air), the hydrogen delivery line must be run inside an intermediate "safety pipe." This safety pipe is made from any material that is compatible with hydrogen and the contents of the existing pipeline; and the purge gas is in this case run inside the channel located between the outside surface of the hydrogen delivery line and the inside surface of the safety pipe.

In a preferred embodiment, the contents of the sweeper line are continuously tested for hydrogen levels, and the collected data therefrom monitored to detect leaks in the hydrogen delivery line. Should a leak be detected that exceeds a predetermined threshold level deemed acceptable, the flow of hydrogen into the hydrogen delivery line may be shut-off manually or programmed to be shut-off automatically, until the leak has been corrected. In another preferred embodiment, multiple hydrogen sensors are located at various intervals throughout the system, thus enabling the location of a hydrogen leak exceeding a predetermined threshold level to be more precisely identified, and the area of concern isolated and removed from service until the leak is corrected, with the balance of the system being able to be restored in the meantime.

In an optional preferred embodiment, a lighter-than-air airship can be used in conjunction with the foregoing system. The airship can carry bulk quantities of hydrogen from a geographic location where it is most-economically produced, to a terminus point at a strategic location relative to the existing pipeline distribution system. Once at this location, the tanks carrying hydrogen can be coupled to an inlet to the above-described hydrogen pipe, and the hydrogen discharged into said system. In another preferred embodiment, the transport of hydrogen using the airship can be in a liquid (cryogenic) state and, upon delivery at the destination point, a vaporizer is used to convert the hydrogen from liquid to gaseous form.

In at least one aspect, the subject technology relates to a hydrogen distribution system for transporting hydrogen from a hydrogen supply source to at least one end-user location. The system includes an existing pipeline and a hydrogen delivery line configured to carry pressurized hydrogen. The hydrogen delivery line is located inside the existing pipeline such that a sweeper gas within the existing pipeline flows around an exterior of the hydrogen delivery line and purges any hydrogen that leaks from the hydrogen delivery line. At least one inlet into the hydrogen delivery line is configured to allow hydrogen to be injected into the hydrogen delivery line. At least one outlet from the hydrogen delivery line is configured to allow hydrogen to be withdrawn from the hydrogen delivery line.

In some embodiments, the existing pipeline is a gas transmission pipeline, and the sweeper gas is one of the following: natural gas; or synthetic natural gas. In some cases, the system includes a safety pipe located inside of the existing pipeline and around the hydrogen delivery line such that a channel is formed between the exterior of the hydrogen delivery line and an interior of said safety pipe. The channel is sized to allow the sweeper gas to flow through the existing pipeline and along the exterior of the hydrogen delivery line. In some cases, the safety pipe is a plastic or a composite. In some cases, the existing pipeline is a water pipeline, a sewer pipeline, or a storm drain pipeline. In some embodiments, the existing pipeline includes a gas transmission line coupled with at least one of the following: a water pipe; a sewer pipe; or a storm drain. The at least one inlet into the hydrogen delivery line can then occur in a gas transmission pipeline and the hydrogen withdrawn from the hydrogen delivery line occurs after the hydrogen has been transmitted through a water pipe, sewer pipe, or storm drain.

In some embodiments, the system includes at least one hydrogen sensor located at an exit of the existing pipeline, the at least one hydrogen sensor configured to monitor for a presence and amount of hydrogen that has leaked from the hydrogen delivery line into the sweeper gas. In some cases, the system includes at least two in-line hydrogen sensors located at different locations within the existing pipeline. The system can include a data system configured to monitor the at least two in-line hydrogen sensors to determine a level of hydrogen for each in-line hydrogen sensor. The system can further include a recording system configured to separately record the hydrogen levels detected by each in-line hydrogen sensor. Additionally, the system can include a programmable alerting system configured to trigger an alert based on the hydrogen levels. In some embodiments, the system includes at least one shutoff valve configured to selectively isolate and close off sections of the hydrogen delivery line upon being triggered by the alert of the programmable alerting system. In some embodiments, the hydrogen delivery line is FRP pipe codified for use with hydrogen.

In some embodiments, the system includes at least one coupling device, each coupling device connecting a first section of the hydrogen delivery line inside the existing pipeline with a second section of the hydrogen delivery line outside of said existing pipeline. In some cases, the hydrogen delivery line is made of FRP pipe codified for use with hydrogen and the second section of the hydrogen delivery line is a storage area.

In some embodiments, the hydrogen delivery line includes at least one hydrogen sensor. Each hydrogen sensor can be configured to separately produce data related to a detected hydrogen level. The system can further include a means for monitoring the hydrogen levels detected by each of the hydrogen sensors. The system can also include an alerting means (e.g., processor with a display, or other audio or visual output device) configured to generate an alert when the detected hydrogen level indicates that hydrogen is leaking from the hydrogen delivery line.

In some embodiments, the system includes at least one shutoff valve. Each shutoff valve is connected to a coupling. The shutoff valves are located at each interval of a pre-determined length of the hydrogen delivery line, each shutoff valve and coupling configured to selectively close. The system can include a processor configured to identify a location of a hydrogen leak based on the hydrogen levels detected by the hydrogen sensors. Each shutoff valve and coupling can be configured to close to isolate the hydrogen delivery line around the pre-determined length of the hydrogen delivery line in which the hydrogen leak is identified.

In some embodiments, the system includes a valve connected to the existing pipeline to control flow therethrough. The system can then include a first riser connected to the existing pipeline on a first side of the valve. Further, the system can include a second riser connected to the existing pipeline on a second side of the valve. The hydrogen delivery line can then be configured to direct hydrogen through the risers and coupling to bypass the valve.

In at least one aspect, the subject technology relates to a method of transporting hydrogen from a producing location to at least one end user location. Hydrogen is produced from an energy source at the producing location. The hydrogen is then stored in at least one hydrogen storage container. A hydrogen delivery line is located, or placed, inside an existing pipeline, the hydrogen delivery line configured to carry pressurized hydrogen. A sweeper gas is injected around the exterior of the hydrogen delivery line to purge any hydrogen leaking from the hydrogen delivery line. Hydrogen is injected into the hydrogen delivery line from the at least one hydrogen storage container. Hydrogen is withdrawn from the hydrogen delivery line at the end user location.

In some embodiments, the energy source is fixed at the producing location. In some cases, transporting hydrogen includes using at least one of the following: a truck; a train; or a ship. In some cases, transporting hydrogen further includes transporting the hydrogen using a lighter-than-air airship. In some embodiments, transporting the hydrogen using a lighter-than-air airship includes pumping the hydrogen into at least two vessels. After pumping the hydrogen into the at least two vessels, the vessels are loaded onto the lighter-than-air airship. The lighter-than-air airship is flown to a terminus location. The vessels are unloaded from the lighter-than-air airship at the terminus location. At least one empty vessel is loaded onto the lighter-than-air airship. At least one empty vessel is returned to the producing location. In some embodiments, the fixed energy source is a renewable energy source being at least one of the following: wind, solar, hydro, biomass, or geothermal power. In some cases, the hydrogen storage containers are made of FRP pipe codified for use with hydrogen.

In some embodiments, the existing pipeline is a gas transmission pipeline, and the sweeper gas is one of the following: natural gas; or synthetic natural gas. In some cases, the terminus location includes a cradle having at least two anchor points configured to secure the lighter-than-air airship with tie-down cables. The cradle can be configured to rotate to point in a direction of oncoming wind.

In some embodiments, the method includes placing a safety pipe inside of the existing pipeline and around exterior of the hydrogen delivery line. In some embodiments, the existing pipeline is one of the following: a water pipeline; a sewer pipeline; a storm drain pipeline; an underground utility corridor; a rail line; or a tube. In some cases, the existing pipeline includes a gas transmission line coupled with at least one of the following: a water pipe, a sewer pipe, or a storm drain. Injecting the hydrogen into the at least one inlet then occurs in a gas transmission pipeline. In such a case, withdrawing the hydrogen from the hydrogen delivery line occurs after the hydrogen has been transmitted through the storm drain.

In some embodiments, the at least one end user location is an electric utility substation. In some cases, the at least one end user location is a commercial or industrial facility. In some embodiments, the method includes utilizing the hydrogen in an industrial process feedstock. In some cases, the at least one end user location is a filling station for dispensing hydrogen to fuel cell vehicles. The filling station can, in some cases, compress the hydrogen to a pressure suitable for dispensing to hydrogen fuel cell cars. The filling station can, in some cases, compress the hydrogen to a pressure suitable for dispensing to hydrogen fuel cell trucks. In some embodiments, the at least one end user location is a residence.

In at least one aspect, the subject technology relates to a method of storing energy and utilizing stored energy. The method includes storing hydrogen in at least one spool of FRP pipe codified for use with hydrogen. An energy producing system is fueled with the hydrogen. Electrical power is then produced with the energy producing system.

In some embodiments, the method further includes positioning at least one hydrogen sensor in the at least one spool of FRP pipe. The at least one hydrogen sensor detects hydrogen leaks from the at least one spool of FRP pipe. Electronic data is produced evidencing hydrogen leakage when hydrogen leaks are detected. The electronic data is monitored and at least one safety action is taken in response to detecting a hydrogen leak. The method can further include installing a shutoff valve and coupling at each interval of a pre-determined length along the FRP pipe. In some cases, the method includes pinpointing a location of hydrogen leakage based on the electronic data and isolating the pre-determined length of FRP pipe containing the location of hydrogen leakage using the shutoff valves. In some cases, the method further includes, after isolating the FRP pipe containing the location of hydrogen leakage, removing and replacing the pre-determined length of FRP pipe containing the location of the hydrogen leakage using the couplings. In some cases, the pre-determined length is one spool of FRP pipe.

In some embodiments, the hydrogen is produced from renewable energy sources being at least one of the following: wind, solar, hydro, biomass, or geothermal power. In some cases, the energy producing system is a gas turbine. In some cases, the energy producing system is a fuel cell.

These and other elements of the subject technology are described through the use of the following drawings and written description.

BRIEF DESCRIPTION OF THE DRAWINGS

FIG. 2 is a block flow diagram illustrating the principles of this technology disclosure.

FIG. 3(*b*) is a side view of a hydrogen pipeline in accordance with the principles of this technology disclosure.

FIG. 3(*c*) is a section view of FIG. 3(*b*) showing use of a safety pipe in addition to the hydrogen delivery line.

FIG. 3(*d*) is a detailed cutaway view of the hydrogen distribution pipeline of FIG. 3(*b*) and associated elements for transporting and distributing hydrogen.

FIG. 4(*b*) depicts the transport of this hydrogen from a main terminal to key distribution nodes on Oahu. FIG. 4(*c*) shows an example where gas transmission lines may be used to transport hydrogen to key storage and distribution locations. FIG. 4(*d*) illustrates the opportunity for widespread distribution of such green hydrogen to a large number of end user locations through water, sewer and storm drain pipelines.

Figure 1B:
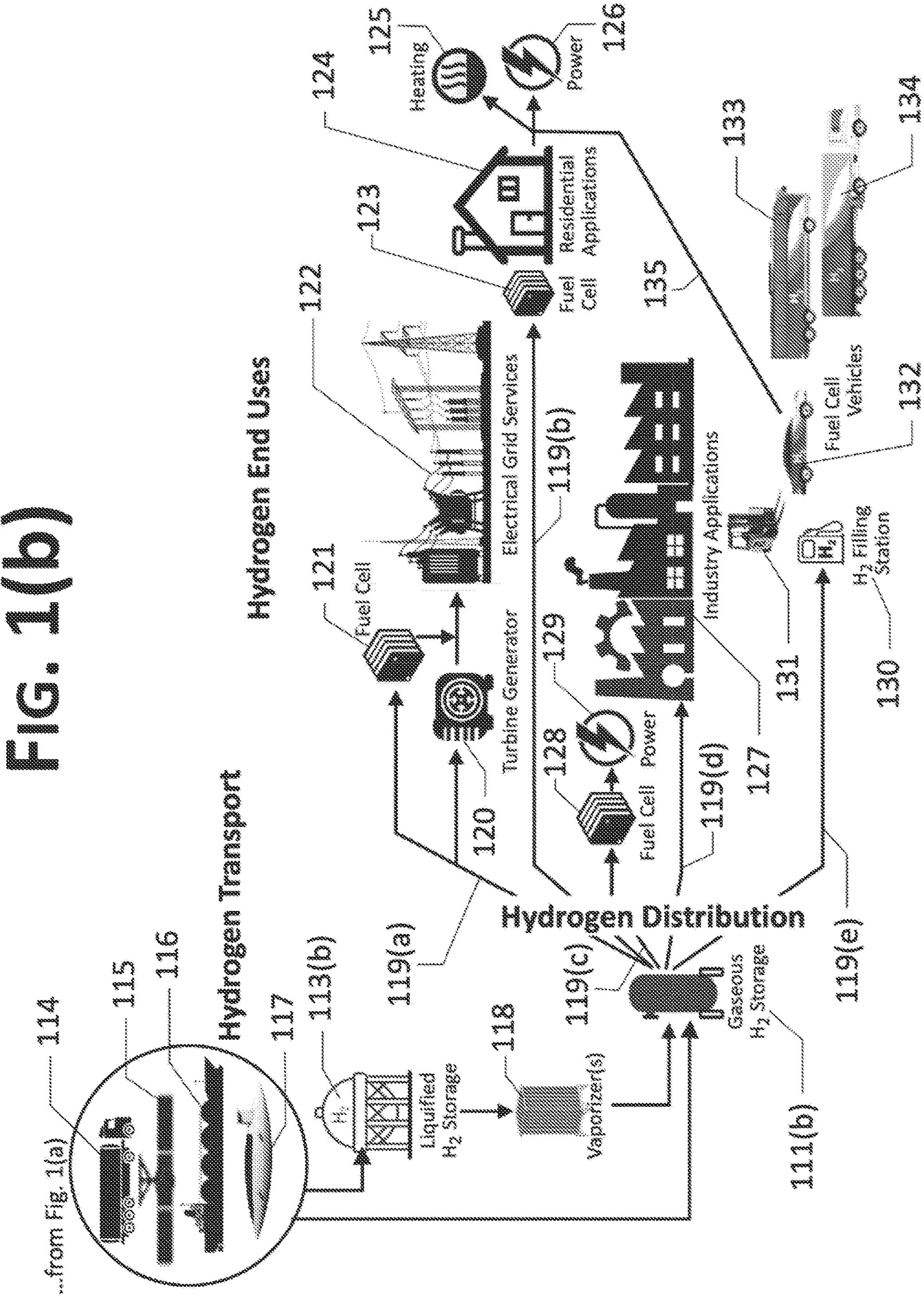
FIG. 1(*a*) is a schematic diagram depicting the production of "green" hydrogen, its storage and optional transport means, while FIG. 1(*b*) is a schematic diagram depicting its removal from these transport means, its storage in tanks, and distribution to the various end uses for such hydrogen.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope of the disclosure, as defined by the appended claims. As used throughout this application, the word "may" is used in a permissive sense (i.e., meaning having the potential to) rather than the mandatory sense (i.e., meaning must). Similarly, the words "include," "including," and "includes" mean including, but not limited to. Additionally, as used herein, the terms "interconnected," "connected, "coupled" or "attached" may refer to two or more components connected together, whether that connection is permanent (e.g., welded or glued) or temporary (e.g., bolted, held by a physical object, or held in place by friction or tension), direct or indirect (i.e., through an intermediary), mechanical, chemical, optical or electrical.

DETAILED DESCRIPTION

The subject technology describes improvements over the prior art, including a new and unique system, method and apparatus for transporting hydrogen from where it is most advantageously produced, storing it at scale, and then distributing it to one or multiple points of end use in a manner that is more cost effective and that overcomes a number of long-standing technical challenges to enable the transition from fossil fuels to a hydrogen economy. As described in the Background section, cities, most towns and many rural communities throughout the world are served by expansive natural gas, oil and other types of pipelines. In addition, all cities, towns and many rural communities have invested heavily in water, sewer and storm drain systems as essential public infrastructure. The land for these existing pipelines has been acquired; rights-of-way and regulatory approvals have already been granted; and substantial investments have been made to excavate, install and maintain them. A method and apparatus that will enable hydrogen to be safely transported and distributed within such existing pipelines, as herein disclosed, enables a much more cost-effective hydrogen delivery network than any other known or currently proposed alternative.

In a preferred embodiment, adapting such existing pipelines to transport and distribute hydrogen entails inserting a hydrogen delivery line contained within a larger diameter safety pipe into the existing pipeline, although under certain conditions use of the safety pipe may be optional. As hereinafter described in detail, the hydrogen delivery line is preferably made of FRP pipe or an equivalent material that is codified for use with pressurized hydrogen. The safety pipe (or in the optional case the existing pipeline) surrounding it serves as a means of collecting any hydrogen that may leak from the hydrogen delivery pipe. A sweeper or inert purge gas flowing outside of the hydrogen delivery line removes any hydrogen that has leaked from the hydrogen delivery line. At least one hydrogen sensor is used to test the sweeper or purge gas for hydrogen content and the flow of hydrogen may be shut-off in the event the level of hydrogen leaking into that gas exceeds a predetermined threshold level. In another preferred embodiment, a fiber-optic line can be installed to carry signals from hydrogen sensors located throughout the system, thus allowing hydrogen leaks that exceed a predetermined threshold level to be located, the area requiring repair isolated, and expeditiously corrected.

These and other aspects of the subject technology are disclosed through use of the following illustrative figures.

FIG. 1 is comprised of FIGS. 1(*a*) and 1(*b*). FIG. 1(*a*) depicts the production of "green" hydrogen 101, its storage and alternative means for transporting it. As shown therein, hydrogen gas 101 is produced through electrolysis using one or a plurality of electrolyzers 102, which may employ any of several well-known technologies such as alkaline and proton exchange membrane (PEM) electrolysis, and in the future may utilize solid oxide electrolysis or another new technology. As shown, electrolyzer 102 produces hydrogen 101 by passing an electrical current 103 through an anode (+) and cathode (−) suspended in water 104 to release $H_2$ and $O_2$ molecules.

Electricity 103 is preferably produced from renewable sources such as kinetic energy from windmills 105, solar radiation collected from photovoltaic cells 106, turbine power from hydro sources 107, or geothermal energy 108. Other sources of energy can also be used such as off-peak or curtailed power, as well as new forms of renewable energy such as biofuels generated from landfills and wastewater treatment plants, and gasification of biomass, municipal solid waste, and agriculture residues and green waste. It is well understood that a significant power loss occurs for renewable energy projects from voltage stepping and transmission 109, generally making it most efficient to power the electrolyzer as close to the renewable electricity source 103 as reasonably possible. It is also well understood that fossil fuels can also be used to generate hydrogen and that, in fact, over 99% of hydrogen produced today is made using fossil fuels. Although not depicted in FIG. 1(*a*), in an optional embodiment, nuclear power as well as sources employing fossil fuels (including but not limited to grid power based on coal or natural gas-fired plants as the source of electrical power 103, steam methane reforming and coal gasification) may be used to produce hydrogen 101 without departing from the principles otherwise associated with the hydrogen transport, storage at scale and distribution systems that are hereinafter described.

Hydrogen 101 that is produced may be compressed to the desired pressure using compressor 110 and then stored as gaseous hydrogen in storage container 111(*a*) or liquefied with liquefaction system 112 and stored as cryogenic hydrogen in storage container 113(*a*). Unless such hydrogen is being consumed at the same location as it was produced, it is generally transported in one of four ways. As described in the Background section, the two most commonly used means of hydrogen transport are with a hydrogen transport trailer 114 that is specially designed to transport either gaseous or liquefied (cryogenic) hydrogen, and pipelines 115, including both lines that are specially built to transport hydrogen, as well as pipelines carrying a blend of hydrogen and natural gas.

It is estimated that between 450 and 800 miles of dedicated hydrogen pipelines 115 currently exist in the United States, most located along the Gulf Coast and connecting hydrogen producers (refineries) with well-established, long-term customers. In Europe, there is estimated to be between 700 to 1,100 miles of hydrogen pipelines, the longest extending 250 miles from Northern France to Belgium. In addition, subject to the previously discussed challenges, a blend of up to 20% hydrogen in natural gas has been proposed as a way to make use of the more than 180,000 miles of natural gas transmission lines (also represented by pipeline 115 in FIG. 1).

Two other modes of hydrogen transport are also depicted in FIG. 1(*a*). The first of these involves the use of trains and large cargo ships, collectively illustrated as ship 116. These include Kawasaki Heavy Industries' plans by late 2020 to complete construction of the Suiso Frontier (Kawasaki hull no. 1740), the world's first liquefied hydrogen carrier. Further, distribution of hydrogen with a lighter-than-air airship 117 has been described, such as disclosed in Applicant's '810 patent.

Turning next to FIG. 1(*b*), depicting removal of hydrogen 101 from these transport means 114 to 117, hydrogen 101 is stored in gaseous 111(*b*) or cryogenic 113(*b*) form for regasification using vaporizer 118, and distribution to the various end uses for such hydrogen.

Persons of ordinary skill in the art will understand that local distribution of hydrogen 101, as depicted by lines 119(*a*)-119(*e*), is currently performed solely through use of hydrogen transport trailers 114 or in very limited cases, a dedicated hydrogen pipeline 115. FIG. 1(*b*) depicts five end uses for such hydrogen that already exist or have been proposed. Line 119(*a*) illustrates the distribution of hydrogen 101 for use as fuel in one or a plurality of turbine generators 120 and/or fuel cells 121 to produce power that can be added onto the electric transmission grid 122. Line 119(*b*) illustrates the distribution of hydrogen 101 for use directly or through fuel cells 123 in residential applications 124 including for heating and cooking 125 and for electrical power 126.

Lines 119(*c*) and 119(*d*) depict distribution of hydrogen 101 for use in commercial and industrial applications 127. Line 119(*c*) illustrates its distribution for use in one or multiple fuel cells 128 to produce electric power 129; and line 119(*d*) depicts the distribution of hydrogen 101 to provide a fuel or process feedstock for various uses as a carbon-free replacement for fossil fuel. Distribution line 119(*e*) illustrates the distribution of hydrogen 101 to filling stations 130 for dispensing hydrogen 101 to fuel cell vehicles including industrial equipment such as forklifts 131, consumer and fleet passenger vehicles 132, hydrogen buses 133, heavy-duty trucks 134, as well as other equipment, drones and planes (not illustrated). In turn, such fuel cell vehicles have been proposed to provide supplemental power, as illustrated by line 135, depicting a fuel cell passenger vehicle 132 providing power for residential applications 124-126. Although not depicted, larger fuel cell vehicles such as buses 133 and heavy-duty trucks 134 may provide power during emergencies and grid outages through vehicle-to-grid (VTG) services and by being connected to individual critical loads such as hospitals and communications equipment to support civil defense, humanitarian and disaster relief operations.

Referring now to FIG. 2, a block flow diagram illustrating a method in accordance with the subject technology is shown. Oval 201 represents selection of a geographic location that is preferably near a source of low-cost renewable energy such as wind 105, solar 106, hydro 107 or geothermal 108, that can be used to produce green hydrogen 101, as designated by rectangular box 202. Although it is considered preferable that such hydrogen 101 be produced using energy 103 from renewable energy sources and water 104 such as through electrolysis 102, this does not foreclose other energy sources and production methods, both known and that may be developed in the future. In the event that transportation of hydrogen 101 is not logistically or economically feasible via hydrogen transport trailer or pipeline, optional steps 203 through 209 may be undertaken to transport hydrogen 101 to a location where it can be introduced into the main distribution line (depicted by rectangular box 214, as more particularly described below).

Rectangular box 203 depicts the optional step of collecting hydrogen produced from multiple sources. A non-limiting example of when this may result in the lowest cost alternative is when an electrolyzer is located directly adjacent to physically separated wind devices in a general area. In such case, rather than being required to invest in batteries and lossy electrical transmission cable to distribute the power collected, each source of production could power its own electrolyzer unit, with the hydrogen produced being collected locally for transport to a single loading location. Where needed, such optional hydrogen storage would in a preferred embodiment be stored at up to 2500 psi or higher pressures in the future using FRP pipe, as depicted in rectangular box 204. Where used in place of traditional gaseous storage tanks 111(*a*), such FRP pipe can remain in large spools 313, as more particularly described with respect to illustration 313 on FIG. 3(*b*) below.

Rectangular box 205 depicts that such hydrogen gas 101 may be compressed or liquefied, as desired and/or deemed preferable by the operator, for storage and/or transport. At the appropriate time, as depicted in rectangular box 206, one or a plurality of empty containment vessels are filled with liquid hydrogen or gaseous hydrogen. By way of non-limiting example, such containment vessels may be insulated cryogenic tanks made by Worthington Industries in the case of liquid hydrogen and Titan® high pressure tanks made by Hexagon Lincoln in the case of gaseous hydrogen.

Once these vessels have been filled, in a preferred embodiment they can be loaded onto lighter-than-air airship 117 using a standard tractor cab, forklift or other materials handling equipment. This step, which is represented by rectangular box 207, is preferably done shortly after arrival of airship 117 in order to minimize the turn-around time. In an efficiently designed system, such transport vehicle would return empty vessels from a completed prior delivery, exchange these for pre-filled vessels, and then immediately depart for the destination delivery point for such hydrogen 101. Although a lighter-than-air airship is deemed preferable in specific circumstances, as suggested by use of the generic term "vehicle" in the caption on rectangular box 207, any number of alternative land, air or sea transport vehicles may be used without departing from the principles of the subject technology. Rectangular box 208 then depicts transport of the hydrogen-filled vessels to the intended destination using the selected transport means.

Upon arrival at the destination, rectangular box 209 depicts that the filled vessels are preferably unloaded from the transport vehicle and empty vessels are loaded in their place. In the event airship 117 is used, this exchange of vessels will help to stabilize the craft by minimizing the weight differential that must otherwise be addressed through the release or recompression of lifting gas, or through use of mechanical tie-downs or ballast. Once the exchange of vessels has been completed, the transport vehicle is able to depart on a return trip 225 to the preferred production location, where the foregoing described process designated by boxes 202 through 209 is repeated. During the period that the transport vehicle is making this return trip, the ground crew at the production site can refill the empty vessels with more hydrogen 101 (i.e., step 206) and the crew at the destination can discharge hydrogen 101 from the filled vessels.

If the vessels are filled with liquid (cryogenic) hydrogen, they are connected to one or more vaporizers 118 to convert the liquid back to gaseous hydrogen form. This step is depicted by rectangular box 210. Rectangular box 211 depicts an optional step in the event the operator wishes to temporarily store the gaseous hydrogen product in storage vessel 111(*b*) before introducing it into the distribution main line in step 214. Such optional hydrogen storage would in a preferred embodiment use FRP pipe, as depicted by rectangular box 212, and more particularly described with respect to illustration 313 on FIG. 3(*b*), below.

Alternatively, in addition to the aforementioned options of using traditional storage vessels 111(*b*) and FRP pipe 313, gaseous hydrogen vessels used in transport step 208 or the vaporizer unit(s) depicted in step 210 may be directly coupled with the distribution main line depending on operator preference. As noted above, use of a hydrogen transport trailer is optional; and in the case that the hydrogen production facility is co-located with the terminal location, then the main distribution line may be filled directly after step 202, 203 or 204, as applicable.

In order to ensure proper operation of the hydrogen pipeline, prior to introducing gaseous hydrogen 101 into the main distribution line, the operator will preferably monitor the inlet line pressure and adjust it to the optimal pressure level, as depicted by rectangular box 213. Once such inlet line pressure has been adjusted, gaseous hydrogen is released into the main distribution line through an inlet, as depicted by rectangular box 214. To ensure a proper flow, as depicted by rectangular box 215, the operator will monitor the line's pressure and make adjustments to ensure that optimal pressure levels are maintained.

If intended end uses of such hydrogen 101 are widely disbursed, rectangular box 216 depicts that gaseous hydrogen 101 is next transported to one or more distribution points from which, depending on operator preferences and local market conditions, such hydrogen 101 may be used or can be fed into a broader distribution network. Thus, in a preferred embodiment, such main distribution lines may tend to use existing gas or oil transmission pipelines to interconnect the hydrogen pipeline between these points. In order to provide a "shock absorber" for this distribution network, the operator may optionally store gaseous hydrogen 101 at scale using spools of FRP pipe 313 and/or conventional tank storage 111(*b*), as depicted by rectangular box 217.

To ensure proper operation of the distribution network, prior to introducing gaseous hydrogen 101 into the local hydrogen distribution lines, the operator will preferably monitor the inlet line pressure and adjust it to the optimal pressure level, as depicted by rectangular box 218. Once such inlet line pressure has been properly adjusted, gaseous hydrogen 101 is introduced into the distribution network lines through one or more feed valves, as depicted by rectangular box 219.

In a preferred embodiment, such network distribution line employs existing water, sewer and storm drain pipelines for the hydrogen pipe between the local distribution points and end user locations. Employing this system and method will result in the lowest cost, most widespread distribution of hydrogen 101 to end users, including but not limited to (1) fulfilling grid service needs 122, as depicted by rectangular box 220; (2) extending the reach to individual homes to provide heating, cooking fuel and fuel for hydrogen vehicles 125 and to meet residential power demands 126, as depicted by rectangular box 221; (3) fulfilling commercial and industrial applications 127 and power needs 129, as depicted by rectangular box 222; and delivering gaseous hydrogen to the locations where hydrogen filling stations 130 are located. Once at such filling station 130 locations, a compressor can be used by the operator to bump-up the hydrogen 101 pressure to 10,000 psi for passenger cars; 5,000 psi for heavy duty tractors; or such other desired dispensing pressure, as depicted by rectangular box 223, whereupon hydrogen 101 may be dispensed for fuel cell vehicle use as depicted by rectangular box 224.

Each of the foregoing steps ends at oval 226, thereby completing the sequence. As will be evident to one skilled in the art, all of the steps depicted in FIG. 2 are not required in order to practice the principles of the technology disclosure and thus some of them are optional, it being deemed apparent that each of the steps depicted are attractive and add to the usefulness of the system. Similarly, it should be understood that the order in which these steps are depicted in FIG. 2 is illustrative only and under various circumstances that will be apparent to one skilled in the art, such steps may be taken in a different sequence without departing from the principles of the technology disclosure.

Figure 3A:
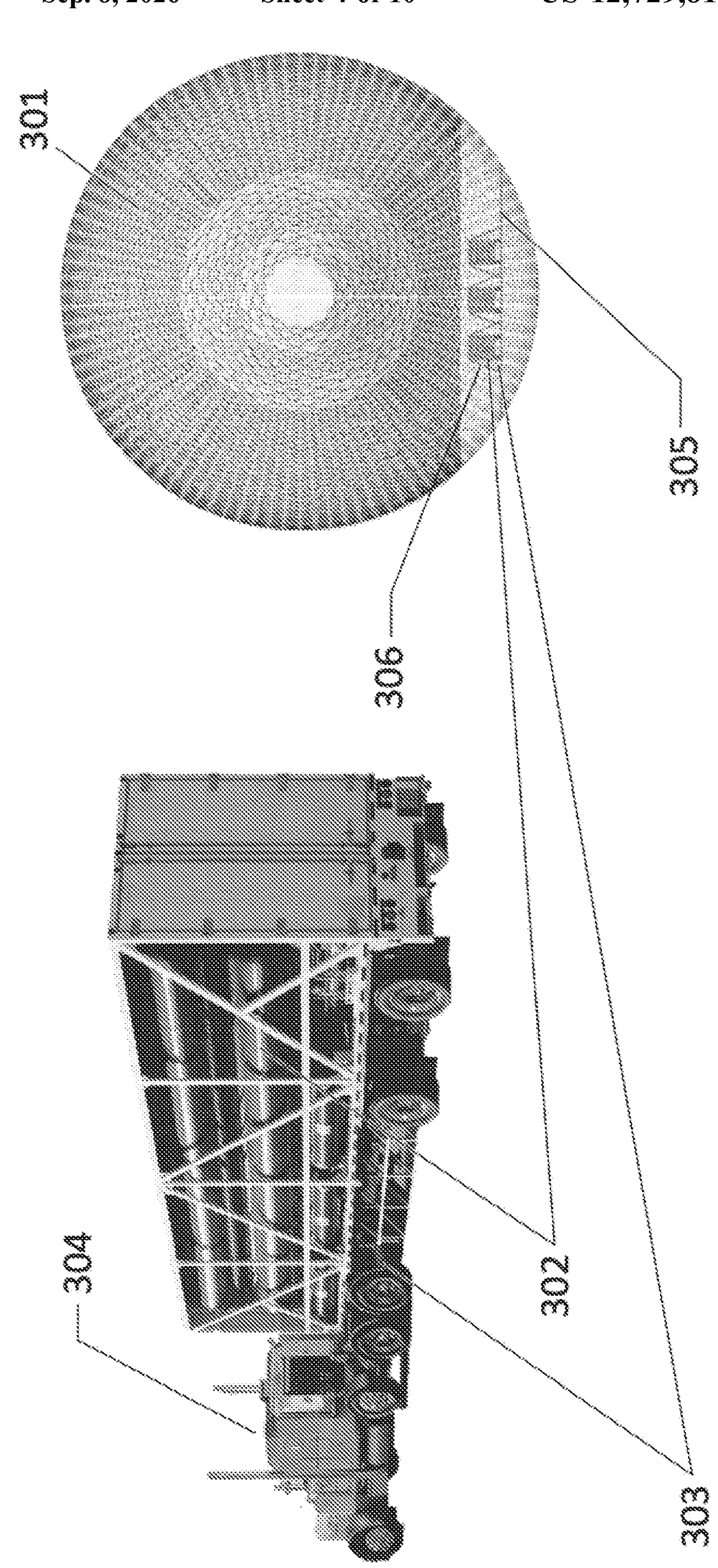
FIG. 3(*a*) shows the components of a system for transporting hydrogen using a lighter-than-air airship which is particularly advantageous in certain situations where other alternatives are not practical or economic.
Figures 3B, 3C:
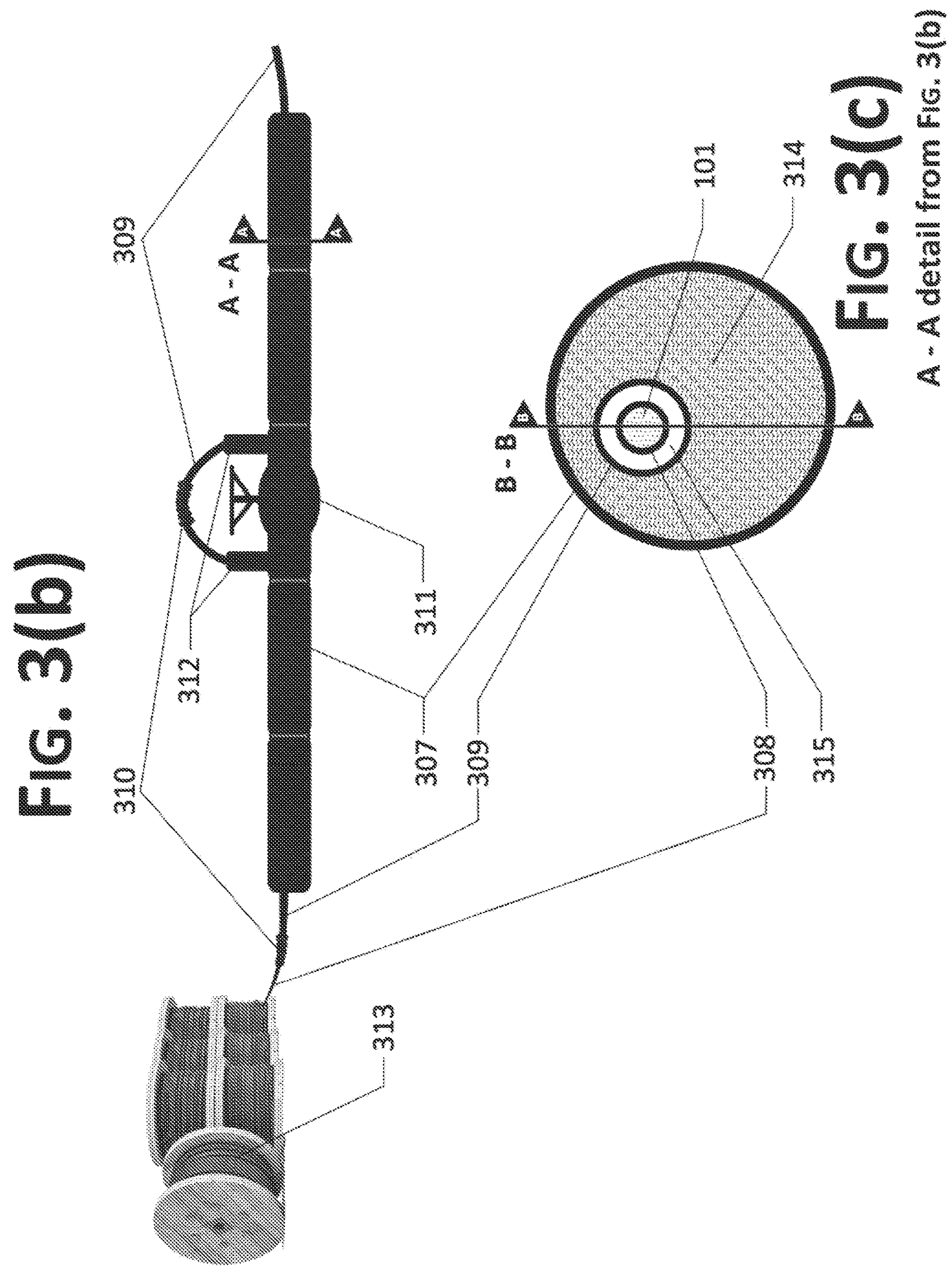
Figure 3D:
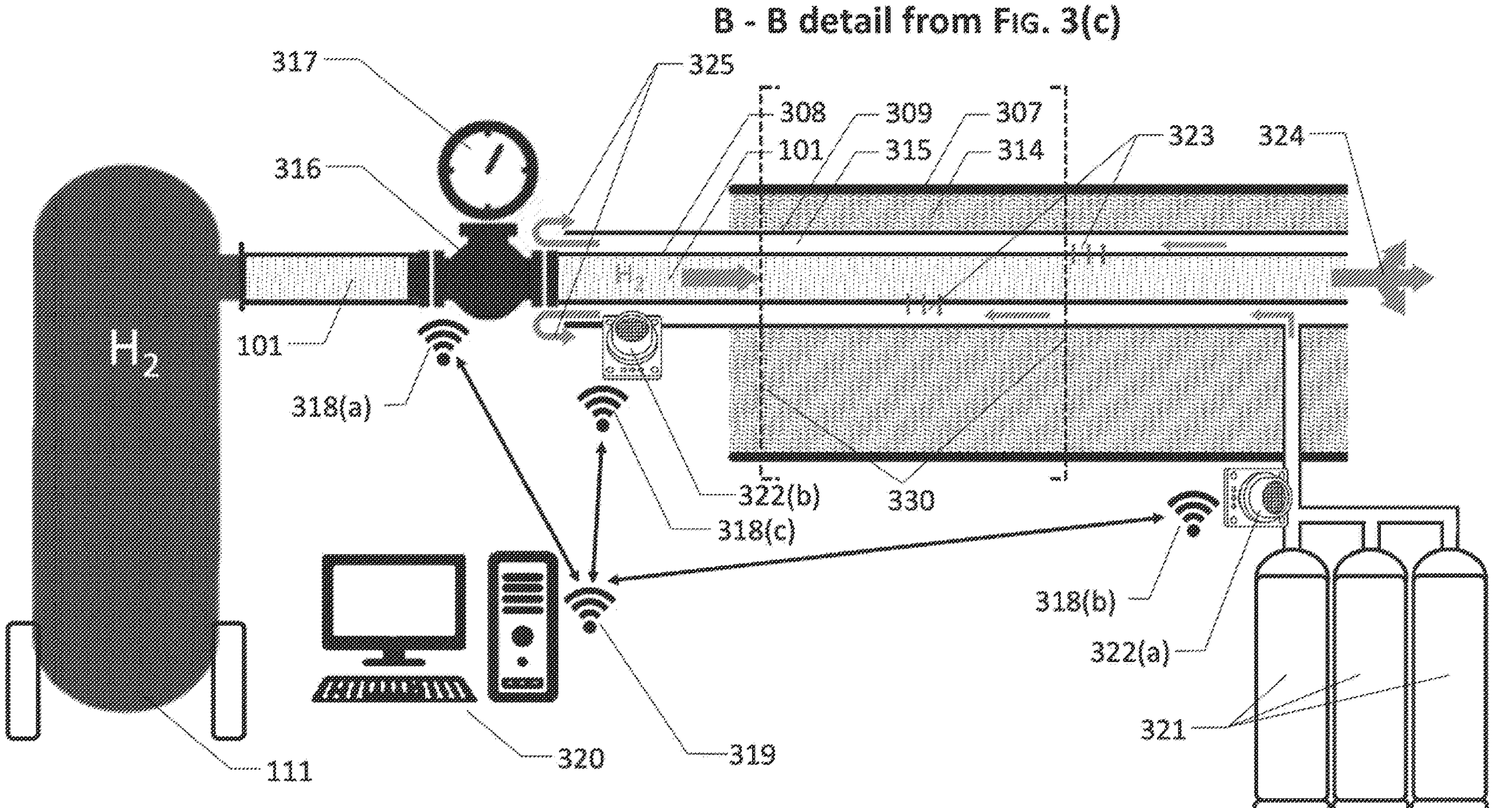

Turning next to FIGS. 3(*a*)-3(*d*), a number of alternative means for transporting and distributing hydrogen 101 in accordance with the principles of the disclosed technology are shown. It will be obvious to persons of ordinary skill that all of these means are not required and thus an operator may wish to employ some but not all of such principles depicted in FIGS. 3(*a*)-3(*d*) depending on particular circumstances.

For the reasons described in the Background, any number of locations exist globally where otherwise very attractive, low-cost renewable energy sources occur in nature, but from which it is not logistically or economically feasible to transmit power and/or hydrogen 101 by pipeline to where active markets exist for such green energy. In some cases, a lighter-than-air airship can be used to address such needs. Exoskeleton 301 in FIG. 3(*a*) corresponds to the section view of an illustrative airship exoskeleton, as are known in the art. The upper approximately 85% of said exoskeleton area is preferably used for lifting gas, leaving the lower approximately 15% principally for cargo storage. As hereinafter described, this area may be used as an attractive means of transporting hydrogen 101 in such situations.

In a preferred embodiment, rated hydrogen cylinders module 302 are pre-filled with gaseous hydrogen 101 as described in step 206 at or nearby an airship landing site that is proximate to where such hydrogen 101 was most advantageously produced, as described with respect to step 202 of FIG. 2. By way of a non-limiting example, assuming 40' long Titan® tanks manufactured by Hexagon Lincoln, the company's standard Titan®4 module of Type 4 composite carbon fiber hydrogen cylinders 302 measures 40' L×8' W×8' H (12.19 m×2.44 m×2.44 m) and can transport 610 kg of hydrogen at 250 bar (approximately 3,625 psi). The module is approved by the U.S. Department of Transportation and has an empty weight of 34,500 pounds (15,649 kg) and a filled weight of 35,850 pounds (16,259 kg). The number of such hydrogen cylinder modules 302 and total volume of hydrogen 101 that can be transported per day will depend on the hours of operation, travel distance, desired number of trips without requiring refueling, and the average cruising speed of the lighter-than-air airship.

As previously discussed, loading such pre-filled cylinders 302 onto said airship may be accomplished by any number of methods. In one preferred embodiment, cylinder module 302 may be loaded onto the airship using a rapid loading and unloading system comprising parallel rails located in rows in the airship hull that receive and hold the cylinder modules 302 by suspension from a rail wheel in a gondola fashion, as are known in the art. In another one preferred embodiment, pre-filled cylinders 302 may remain on transport trailer 303 during said airship's transit. Although selection of the best method will be based on various factors including minimizing loading and unloading time, for the purposes of this illustration, leaving cylinders 302 on the trailer is assumed. Thus, as described with respect to rectangular box 207 in FIG. 2, once the airship arrives and is secured at the desired location, in one preferred embodiment, tractor cab 304 is attached to transport trailer 303, enabling the full rig to be driven directly into the airship's cargo bay.

For reasons that persons of ordinary skill in the art will readily appreciate, it is advantageous that the gross weight of the lighter-than-air airship be kept relatively constant during the loading process. In order to minimize any abrupt weight changes, in one preferred embodiment as the filled cylinders 302 are driven onto the airship, a second tractor cab 304 will unload from the airship an empty cylinder module 302 using its transport trailer 303, resulting in a modest weight change of about 1,350 pounds for the 610 kg of hydrogen.

After this exchange is made, tractor cab 304 transports the empty cylinders module 302 to the location where it will be refilled and the module's transport trailer 303 is unhitched so that tractor cab 304 can be used to transport another cylinder module 302. The empty cylinders are left at the refilling site to be filled with hydrogen 101 at an appropriate time, which filling process may take place from onsite storage 111(*a*) or another storage or upstream production source as depicted in rectangular box 206 of FIG. 2. In an efficient operation, while the tractor unloading empty cylinders 302 is transporting these to the appropriate location, hydrogen transport trailer 303 carrying pre-filled cylinders 302 onto the airship is unhitched from its corresponding tractor cab 304 to enable its driver to use it for the next task. In one optional embodiment, said hydrogen transport trailer 303 and its pre-filled cylinders module 302 are secured to the airship's cargo bay floor 305 using cables 306.

Once the weight of the airship reaches its maximum payload limit after taking into account the weight of fuel required, the cargo hold doors are closed and the lighter-than-air airship ascends to the desired altitude and flies to the destination for the gaseous hydrogen 101 it is carrying in filled hydrogen cylinders 302. Upon arriving at its intended destination, as depicted in rectangular box 209, the foregoing-described process is carried out in reverse, with filled cylinder modules 302 being unloaded from the airship, and other already-emptied cylinder modules 302 being loaded onto it in their place. During the duration of such airship flight, hydrogen 101 can be released from the filled cylinder modules 302 that were left at the destination site, while the empty cylinders 302 that were left at the point of origin are pre-filled at or near the hydrogen 101 production site. Although this process has been described with regard to transporting gaseous hydrogen 101, the foregoing procedure may also be used to transport cryogenic (liquid) hydrogen 101 to the extent this will further minimize the total cost per kilogram of hydrogen 101 at the point received by the end user.

Once at the intended destination, depending on local conditions and other factors that will be readily understood by persons of ordinary skill in the art, cylinder modules 302, hydrogen transport trailers 303 and tractor cabs 304 may be used to transport and/or distribute the hydrogen 101. Alternatively, it may be advantageous to use one or multiple hydrogen transport trailers 114 and/or pipelines 115. In a preferred embodiment, transport and distribution of hydrogen 101 employs the following technology disclosure.

Referring now to FIG. 3(*b*), pipe 307 represents an existing pipeline such as a gas or oil pipeline, water or sewer pipe, storm drain or other pipeline whose route may be useful for the transport and/or distribution of hydrogen 101. Hydrogen delivery line 308, which in a preferred embodiment, as illustrated in FIG. 3(*b*), runs inside of safety pipe 309, is inserted into existing pipeline 307 for the purpose of transporting and/or distributing gaseous hydrogen 101 using the rights of way and capital investment needed to acquire land and/or requisite land rights, secure regulatory approvals, install and maintain such existing pipeline 307. Fast-release couplings and fittings 310 are preferably used to insert hydrogen delivery line 308 into safety pipe 309, and for other safety, utility and maintenance purposes as hereinafter described.

Persons of ordinary skill in the art are aware that in the United States, various regulated public utilities and master limited partnerships (MLPs) own and control transmission and distribution lines and storage facilities that connect supply areas to high-demand markets for natural gas and crude oil. In Europe, such existing pipeline ownership is largely controlled by transmission system operators (TSOs) that are run like private companies despite being publicly controlled. In other countries there is a mix of private ownership under some sort of public regulation, public or indigenous population ownership, or a combination of these. In some cases, water, sewer and storm drain pipelines may be owned by similar interests or by local government entities. As such, the financial return on these existing pipelines 307 may be enhanced based on any number of possible contractual arrangements permitting the installation of such safety pipe 309 in return for compensation to the existing pipeline owner on the basis of the volume per mile of hydrogen 101 passing through such existing pipelines 307.

In the case of gas and oil pipelines, this new revenue opportunity may help to offset the risk of lower income as the volume of fossil fuel transmission declines and hydrogen usage increases in the future. Moreover, such an arrangement will materially reduce both the time and initial capital investment required to establish the hydrogen infrastructure and negotiated tariffs that can be passed through to the end user in the cost per kilogram of hydrogen 101 consumed while simultaneously helping to extend and transition the lifetime economic value of these already "sunk" oil and gas investments.

Where required to accommodate physical obstructions such as shutoff valve 311 in such existing pipeline 307, risers 312 (or their equivalent that are located below ground) may be installed to enable the continuous flow of hydrogen 101 through hydrogen delivery line 308 without adversely affecting the proper functioning of such elements and control features of existing pipeline 307. Risers 312 or their equivalent may also be used to make fast-release couplings and fittings 310 more readily accessible to support isolating and repair of one or more sections of hydrogen delivery line 308 and for enabling use of two or more otherwise unrelated existing pipeline 307 systems to route hydrogen delivery line 308 to the desired locations without comingling the contents of any such existing pipelines 307. Persons of ordinary skill in the art will readily appreciate that use of fully automated electronic metering equipment may be used to monitor the volume of hydrogen 101 flowing through such hydrogen delivery line 308 to assure a proper and fair allocation of transmission fees between multiple existing pipeline 307 owners and, in a preferred embodiment, the investors in upgrades and improvements required for enhancing such systems for hydrogen 101.

In a preferred embodiment, large spools 313 of FRP pipeline may be used for gaseous hydrogen 101 storage in lieu of traditional hydrogen tanks 111. Such alternative storage based on spools of FRP pipe 313 affords a number of non-obvious advantages over the current state of the art in hydrogen storage at scale and/or to provide a "shock absorber" for the distribution network. Among other things, as noted in the Background disclosure, FRP pipe has an existing ASME code with a 50-year useful life and requires minimal maintenance, whereas traditional gaseous hydrogen storage tanks 111 have a much shorter life and require costly maintenance and recertification approximately every 5 years. In addition, large diameter FRP pipe can be extruded on site, thereby avoiding difficult transportation logistics associated with large volume hydrogen storage tanks 111 (or the cost and technical issues associated with using underground caverns for such storage) and enhance the ability of operations to scale up quickly at new locations. On site extrusion of FRP pipe has an additional advantage of making it possible to ship bulk materials such as resin and avoid "shipping air" when shipping finished pipe. Moreover, optical sensors, hydrogen sensors, electric signal wires, power cables and capillary tubes can be integrated within the layered construction of FRP pipe to assure that any leaks of hydrogen 101 are quickly pinpointed. Shutoff valves in combination with fast-release couplings and fittings 310 at the end of one or multiple spools of FRP pipe enable an operator to rapidly isolate and replace damaged sections, or to adjust total storage capacity.

Utilizing spools of FRP pipe 313 for H2@Scale will result in a substantially lower total lifetime cost than traditional hydrogen 101 storage solutions when estimated over a 50-year useful life, and taking into account savings in installation expense, site approval delays, avoided recertification requirements, and reduced replacement costs. Moreover, when used in conjunction with a fuel cell for the purposes of reconverting hydrogen 101 back to electricity, utilizing spools of FRP pipe 313 is estimated to be less than one-tenth (10%) as costly as battery storage of energy storage at scale, with a number of other advantages including much longer energy retention time, longer useful life and, depending on battery type, significantly less natural resource constraints and/or waste disposal issues. The foregoing cost savings are highly material, and counter-intuitive given the significantly higher surface area to total volume ratio that spools of FRP pipe 313 represent compared to traditional hydrogen storage tanks 111, and the common preferences for battery storage held by persons of ordinary skill in the art.

Turning next to FIG. 3(*c*), a detail view of section A-A from FIG. 3(*b*) is presented to illustrate the contents of existing pipeline 307. Depending on specific circumstances, the contents 314 of existing pipeline 307 may be natural or synthetic gas, crude oil or other liquid petroleum products, biofuels, various other industrial gases, potable and non-potable water, sewage, slurry, storm runoff and other liquids. Provided there is adequate volumetric capacity, safety pipe 309 (in turn containing hydrogen delivery line 308) may be run inside existing pipeline 307 for the purpose of transporting gaseous hydrogen 101 as previously described. This avoids contamination and enables transport of pure, higher value hydrogen 101, if necessary or desirable. In a preferred embodiment, a channel or sweeper line 315 between the outer surface of hydrogen delivery line 308 and the inner surface of safety pipe 309, is used as a sweep line for an appropriate purge gas to be introduced, and to dilute and collect any gaseous hydrogen 101 that may leak from hydrogen delivery line 308.

In an optional alternative embodiment, subject to regulatory approval, safety pipe 309 may be omitted when the contents 314 of existing pipeline 307 consist of a gas or liquid that can serve as an appropriate sweeper gas for collecting any hydrogen 101 that may leak from hydrogen delivery line 308, provided that the operator of existing pipeline 307 is not concerned about such a leak contaminating contents 314 of such existing pipeline 307. Non-limiting examples of contents 314 of existing pipelines 307 that may enable use of this optional alternative embodiment are synthetic natural gas (SNG), liquid natural gas (LNG), nitrogen, carbon dioxide or helium.

FIG. 3(*d*) presents in the area between the two vertical dashed lines 330 drawn thereon, an enlarged view of section B-B from FIG. 3(*c*). In particular, this portion of FIG. 3(*d*) illustrates existing pipeline 307 and its contents 314, as well as safety pipe 309 and its contents. As discussed above, in a preferred embodiment, the contents of safety pipe 309 include hydrogen delivery line 308, its content of gaseous hydrogen 101, and sweeper line 315 which functions as a channel which sweeps any hydrogen leaks 323. In one non-limiting example, safety pipe 309 is a 6" diameter flexible pipe made of any material including but not limited to metals, plastics and composites that is compatible both with hydrogen and the selected purge gas running through said sweeper line 315 and hydrogen delivery line 308 is a 3" FRP pipe suitable to carrying gaseous hydrogen 101 at any pressure from atmospheric to the maximum allowable working pressure of said hydrogen delivery line 308.

In accordance with steps 214 and 218 from FIG. 2, gaseous hydrogen 101 is injected into hydrogen delivery line 308 through inlet valve 316 from hydrogen storage tank 111 or another storage system (including without limitation, in a preferred embodiment, from spooled FRP pipe storage system 313), an upstream hydrogen pipeline, hydrogen production or vaporizer system, compressor or other source. As applicable, in accordance with steps 213, 215, 217, or 219 from FIG. 2, such injection is monitored using pressure gauge 317 to assure hydrogen 101 is at the appropriate pressure before and after injection into hydrogen delivery line 308. Critical information regarding the injection of hydrogen 101 including volume released, purity and pressure is preferably captured at this and other appropriate points for control and billing purposes, including but not limited to at the outlet points that hydrogen 101 is delivered to end users and withdrawn from the system (represented in FIG. 3(*d*) by arrow 324). This data is conveyed by wireless transmitter 318(*a*) to receiver 319, which is in turn connected to active monitoring system 320 to record, analyze against other data, plot, and initiate the appropriate preventative, responsive and/or billing and remuneration actions.

Sweeper line 315 is filled with purge gas from storage tanks 321. Hydrogen sensor 322(*a*) is used to establish the baseline levels of hydrogen contained in such purge gas; and this data is preferably conveyed by wireless transmitter 318(*b*) to receiver 319, and in turn uploaded into active monitoring system 320. Additional hydrogen sensors such as sensor 322(*b*) may be strategically located along said sweeper line 315 to separately monitor the levels of hydrogen, if any, that is contained in the purge gas as it passes each sensor's location; and this data may be similarly communicated through wireless (or direct) connection 318(*c*) to said monitoring system 320 and combined with other data already in system 320 to create a real time map of the system and to monitor for operating anomalies. Persons of ordinary skill in the art will understand that the foregoing use of well-placed hydrogen sensors 322(*a*), 322(*b*), active monitoring, real time computing and intuitive displays, and/or processors, enables such system to detect and locate the source of any hydrogen leaks 323 from said hydrogen delivery line 308. Similarly, persons of ordinary skill in the art will understand that at the appropriate points, after purge gas within sweeper line 315 has been used in the indicated manner, it may be sold as a by-product of the system, reused one or more times in the sweeper line 315, or at the discretion of the operator, discarded in a responsible manner as a waste product. These alternatives are represented by arrows 325.

In the optional alternative embodiment wherein existing pipeline 307 is used for transmission of synthetic natural gas or another product 314 that can be used as the sweeper gas in the foregoing system, such hydrogen sensors 322(*a*), 322(*b*) would rather be used to monitor hydrogen levels in contents 314 to detect hydrogen leaks 323 and ensure operation of the system without adversely affecting its safety or efficiency. Persons of ordinary skill in the art will appreciate that in this optional alternative embodiment, the contents 314 of existing pipeline 307 are themselves able to sweep/purge any hydrogen 101 that may leak from hydrogen delivery line 308, and such contents 314 should be actively monitored for changes in hydrogen level to ensure the proper steps are taken in the event of a failure of said hydrogen delivery line 308 or excessive leaks 323 of hydrogen 101 therefrom.

In both the preferred and optional alternative cases, should operating personnel and/or automated software monitoring system 320 observe excessive hydrogen 101 levels in such gas, an instruction can manually or using automated programming be dispatched using wireless transmitter 319 in communication with receiver 318(*a*) to close valve 316 until the problem has been located and corrected. Persons of ordinary skill in the art will understand such emergency protocols, as well as the purpose for fast-release couplings and fittings 310 and additional optional components typically used with pipeline transmission of industrial gases, including but not limited to shut-off valves that can be used to isolate sections of hydrogen delivery line 308 in a well-ordered system.

Figure 4A:
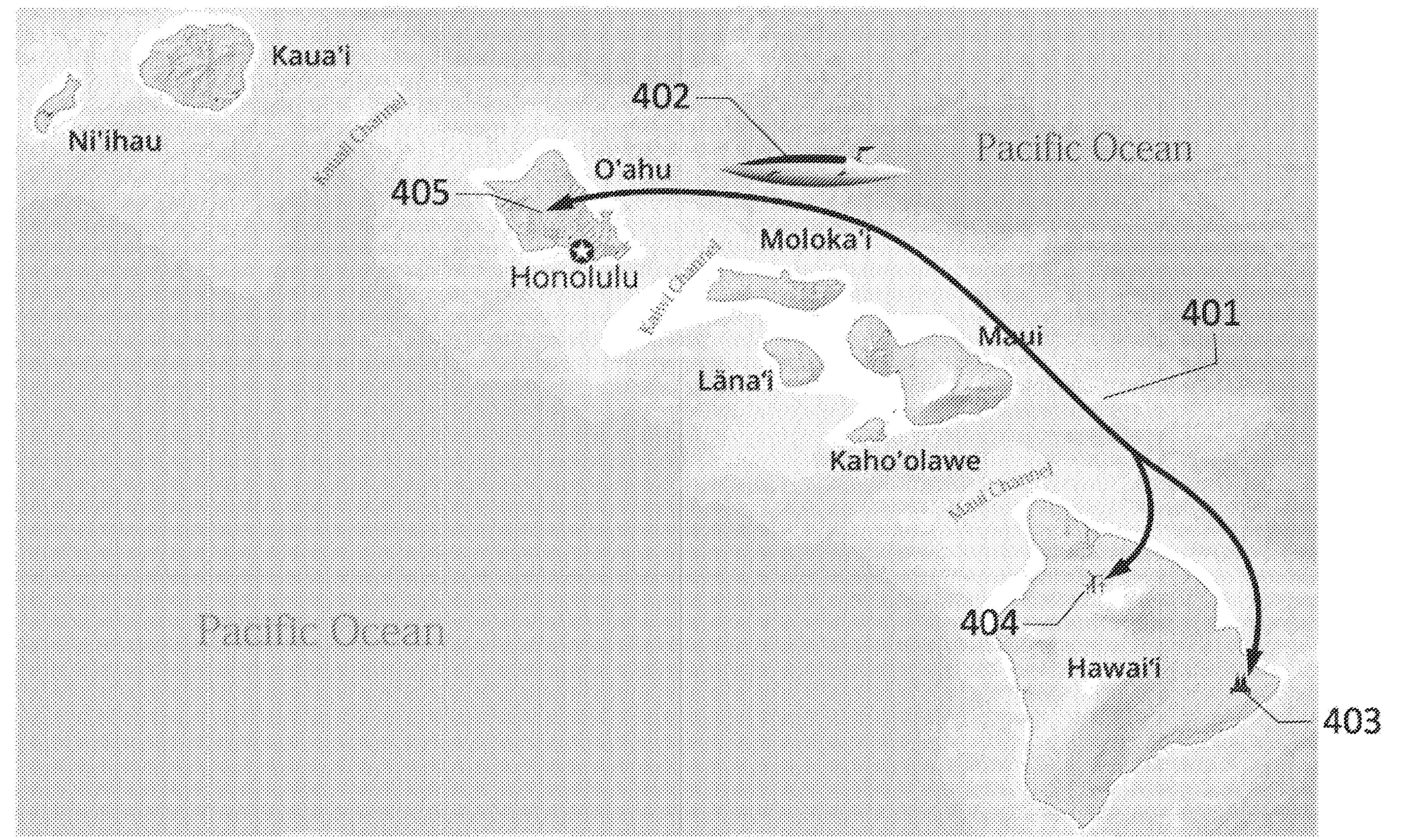
FIGS. 4(*a*)-4(*d*) depict maps of an illustrative case involving production of green hydrogen from wind and/or geothermal energy on the Big Island of Hawaii and its transport and widespread distribution on the more densely populated island of Oahu. In particular, FIG. 4(*a*) depicts the transport of hydrogen via a lighter-than-air airship between the island of Hawaii and a terminus point on the island of Oahu.
Figure 4B:
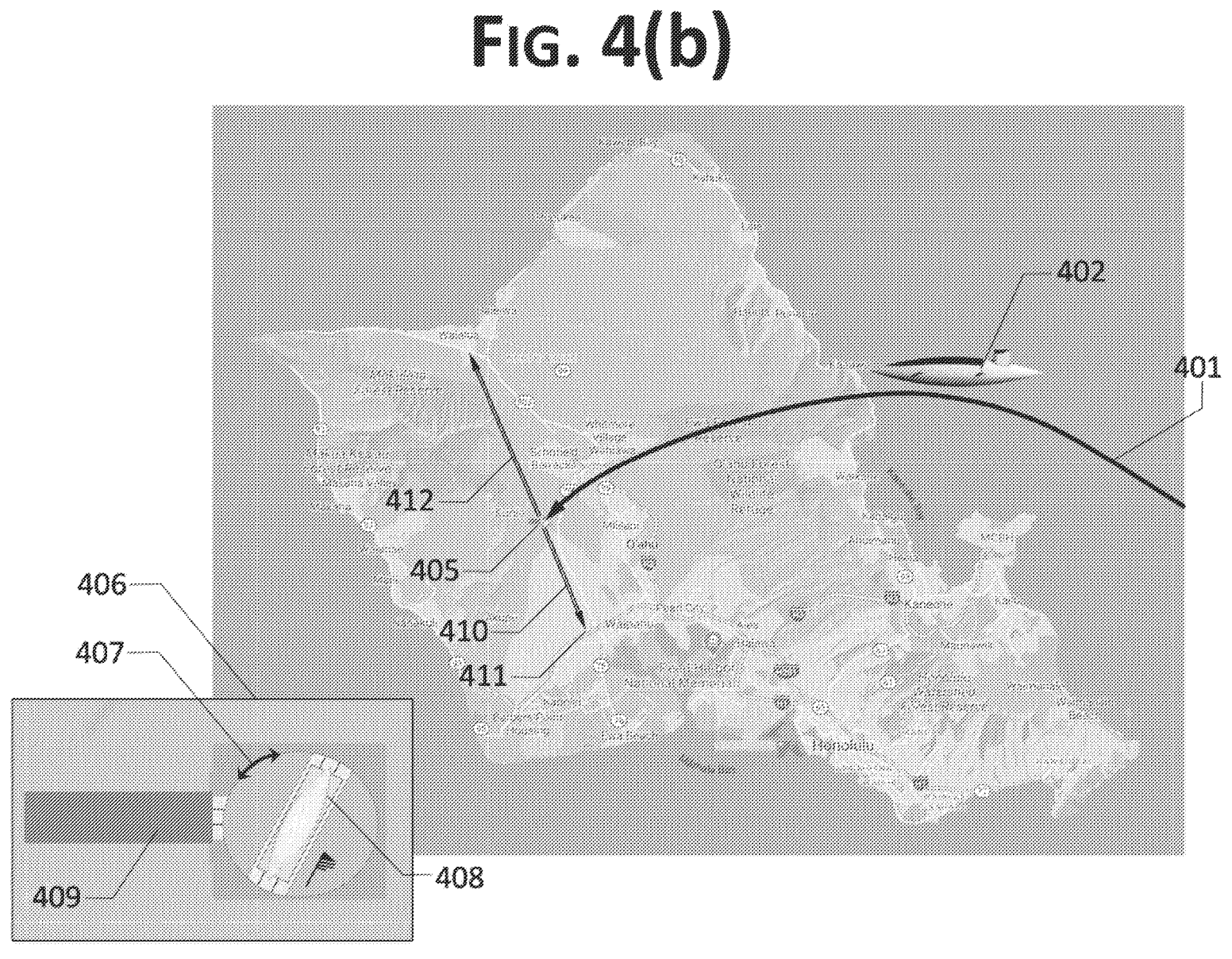
Figure 4C:
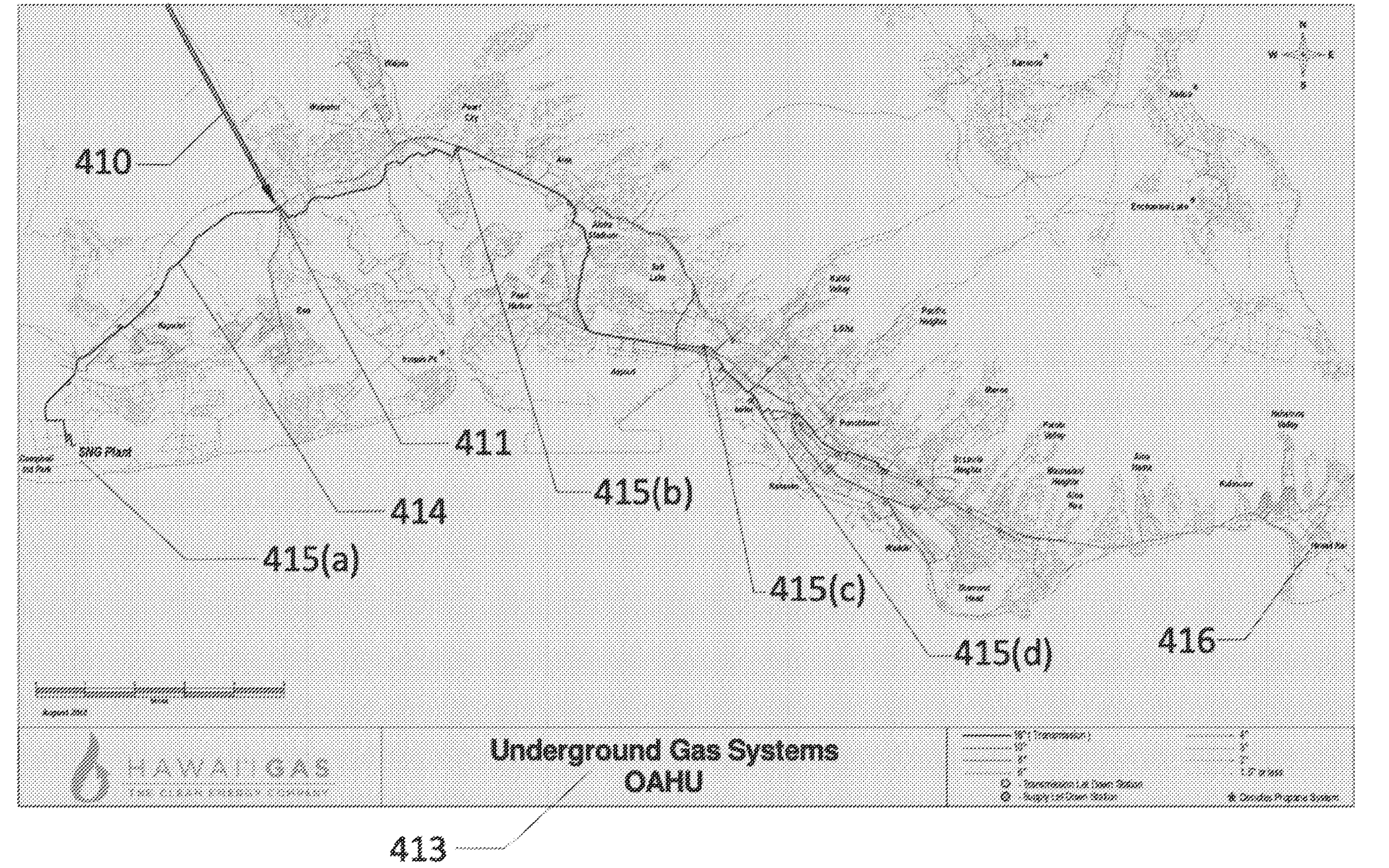
Figure 4D:
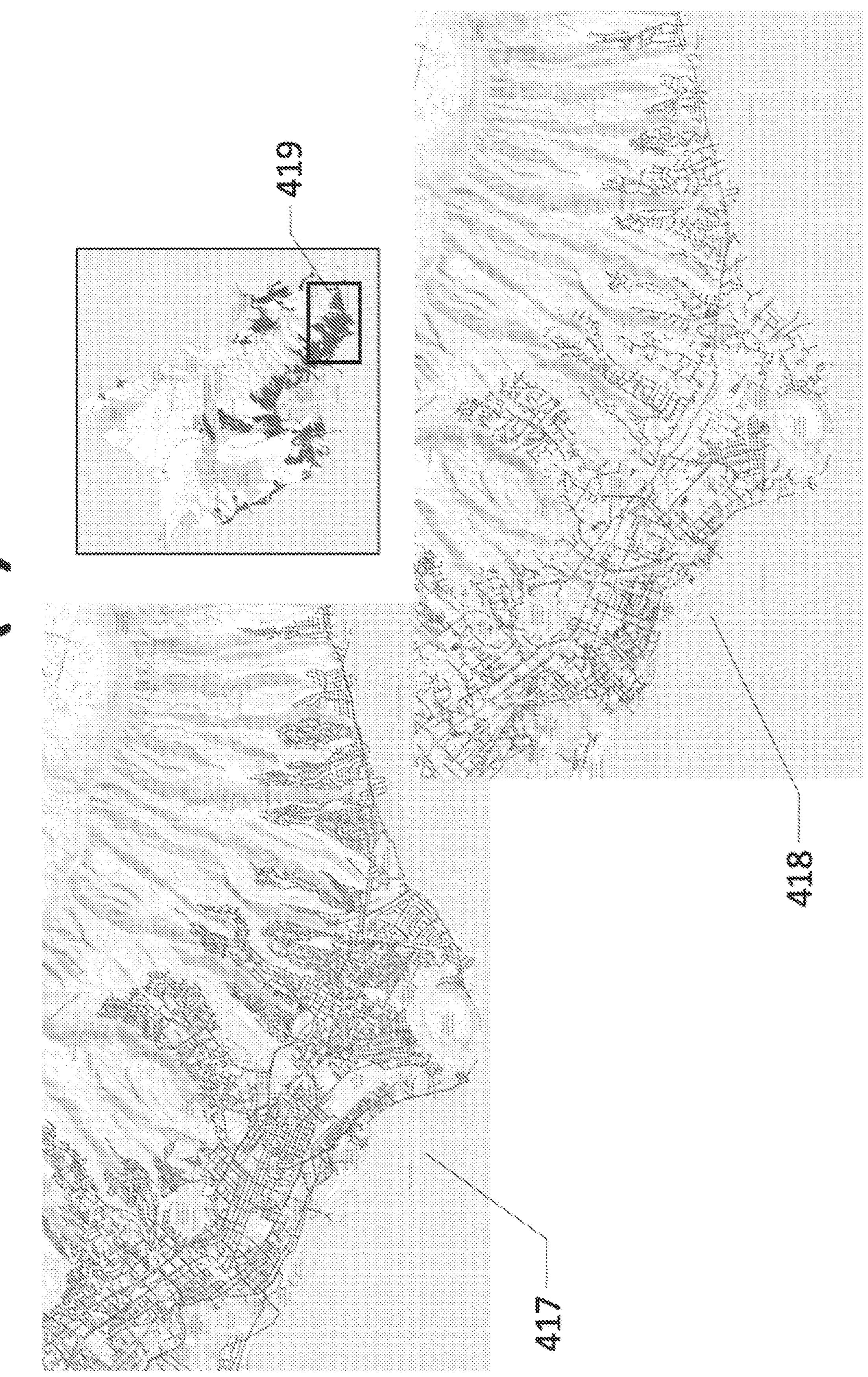

FIGS. 4(*a*)-4(*d*) depict a non-limiting illustrative case involving the production, transport, storage at scale and distribution of green hydrogen 101. The case assumes production of green hydrogen 101 at uniquely advantageous sites on the Big Island of Hawaii and its transport to, and widespread distribution on, the island of Oahu although the principles of the disclosed technology have applicability globally as part of establishing a safe, low cost and rapidly extensible infrastructure for transport, H2@Scale, and distribution of hydrogen 101 as an alternative to fossil fuels for transportation and power.

FIG. 4(*a*) illustrates the approximately 275-mile flight path 401 for a lighter-than-air airship 402 connecting the Puna geothermal production site 403 at the south end of the island of Hawaii and/or the areas 404 that are ideally suited to large wind farms at elevation on the Island, to a potential terminal location 405 on approximately 25 acres of property in Oahu. Assuming an average cruising speed of between 150 and 200 miles per hour, airship 402 may have a net payload potential of between 200 and 300 tons, thereby enabling each round-trip flight of 4 hours or less to transport approximately 10,000 kg of gaseous hydrogen 101 at 3,625 psi from a landing site near production sites 403 and/or 404 on the Island of Hawaii, to terminal 405, where shown on the Island of Oahu. Assuming five round-trip flights per day and 360 days operation per year, one airship is capable of transporting 18 million kilograms per year of gaseous hydrogen 101 to Oahu that will be useful towards achieving the State's "Clean Energy Initiative" goals.

FIG. 4(*b*) shows a map of Oahu and the final portion of the preferred air route 401 for airship 402 to terminal 405, near Kunia Village. Close-up detail 406 of this area illustrates that in one preferable embodiment, terminal 405 incorporates an optional turntable 407. The turntable 407 includes a cradle 408 that includes at least two anchor points on opposing sides of the cradle 408, which are configured to connect to tie-down cables that may in turn be connected to the lighter-than-air airship 402. Such tie-down cables can then be used to secure the airship 402 to the cradle 408. The turntable 407 enables the cradle 408 to rotate so that lighter-than-air airship 402 may always point directly into the wind when landing and taking off from terminal 405, and optionally to enable a tug (not shown) to pull said airship 402 into hanger 409 once airship 402 has been securely tethered in cradle 408.

FIG. 4(*b*) also indicates the installation of two new transmission pipelines. Pipeline route 410 is approximately 6 miles in length, connecting from central Oahu and optional airship terminal 405, to one of HawaiiGas' eight letdown regulator sites 411, where the company's existing 16-inch main transmission line currently interconnects with its synthetic natural gas (SNG) distribution systems on the island of Oahu. Although this embodiment contemplates a new pipeline segment, the proposed route would enable HawaiiGas to build a new distribution system to serve Wheeler and Schofield military bases in central Oahu and with a second, approximately 10-mile extension 412 from central Oahu to Waialua, to transport and distribute SNG and hydrogen 101 to the North Shore of the island, which currently does not have gas service. While these pipeline extensions are considered to be preferable, in an alternative embodiment, transmission line extensions 410 and 411 could be deferred, and the areas at least temporarily serviced by using tractor cabs 304 to drive hydrogen transport trailers 303 and their cylinder modules 302 to one or both of these interconnection points.

FIG. 4(*c*) shows a map 413 of the major synthetic natural gas lines owned by HawaiiGas on the south side of the Island of Oahu. Among these existing assets, the company owns and operates a 22 mile-long, 16-inch diameter steel transmission pipeline 414 that in a preferred embodiment would serve as existing pipeline 301 for transport of hydrogen 101 to multiple strategically located distribution points in addition to interconnection point 411. Transmission pipeline 414 starts at HawaiiGas' synthetic natural gas (SNG) plant 415(*a*), located at Campbell Industrial Park near the southwest tip of the island, and runs eastward along the southern part of Oahu, delivering SNG to interconnection point 411 and seven interconnected SNG distribution systems via letdown regulators.

HawaiiGas' SNG plant 415(*a*) currently produces SNG from naphtha, a liquid petroleum feedstock. Accordingly, in a preferred embodiment, the company's total daily demand for naphtha will be replaced with less than 20% of the green hydrogen 101 produced and transported daily from Oahu and transported from terminal 405 either by tractor cabs 304 and transport trailers 303, or by using new pipeline 410 and existing pipeline 414 as pipe 301 in the disclosed technology. The technology can also be used to transport the remaining portion of green hydrogen 101 from interconnection point 411 to letdown regulator sites 415(*b*), near Pearl City; 415(*c*), near Honolulu's International Airport; and 415(*d*), at the eastern end of transmission line 414 and serving the company's largest SNG distribution system at Pier 38 in Honolulu Harbor, near downtown Honolulu. In addition, using selectively smaller diameter hydrogen delivery line 308 and safety pipe 309 in one preferred embodiment, HawaiiGas' 10, 8, 6 and 4-inch lines can be used to transport hydrogen 101 to other distribution points between downtown Honolulu and Hawaii Kai 416.

FIG. 4(*d*) shows Honolulu area maps of water and sewer lines 417 and the storm drain lines 418 for the island's most densely populated areas on the southeast tip of Oahu shown in highlighted section 419. The density of such existing pipelines in the area exemplify the breadth of potential distribution reach that is possible through using the disclosed technology. Persons of ordinary skill in the art will understand this is likely to be true for communities all around the globe where hydrogen distribution is needed.

From the foregoing disclosure, it will be appreciated that, although specific implementations have been described herein for purposes of illustration, various modifications may be made without deviating from the spirit and scope of the appending claims and the elements recited therein. In addition, while certain aspects have been presented as optional or preferred embodiments, all such embodiments are not required and thus may be incorporated as dictated by the circumstances to achieve the desired result. Moreover, while certain aspects are presented below in certain claim forms, the inventors contemplate the various aspects in any available claim form. Various modifications and changes may be made as would be obvious to a person skilled in the art having the benefit of this disclosure. It is intended to embrace all such modifications and changes, and accordingly, the above description should be regarded in an illustrative rather than restrictive sense.

What is claimed is:

1. An assembly for delivery of a product, the assembly comprising:
- a first pipe;
- a product delivery line, configured to carry the product, disposed in the first pipe such that a channel is formed between an exterior of the product delivery line and an interior of the first pipe,
- wherein the assembly is configured to purge the channel; and
  - a data system having at least one in-line sensor disposed within the channel to continuously monitor for a presence and amount of a product throughout the channel.

2. The assembly of claim 1, wherein the assembly is further configured such that product that leaks from the product delivery line into the channel can be removed with a not significant amount of leaked product otherwise escaping from the channel into a space outside the first pipe.

3. The assembly of claim 1, wherein the channel is a portion of a closed system isolated from a space outside the first pipe.

4. The assembly of claim 3, further comprising:
- a second sensor configured to detect a second amount of product at a second location along the channel.

5. The assembly of claim 4, further comprising:
- a monitoring system, in communication with the first and second sensors, configured to shut off a source of the product if at least one of the detected first and second amounts is greater than a predetermine threshold.

6. The assembly of claim 5, wherein the monitoring system is further configured to:
- determine a location of the leak as a function of the detected first and second amounts.

7. The assembly of claim 1, wherein the assembly is further configured to remove product that leaks from the product delivery line into the channel by an injection of a purge gas.

8. The assembly of claim 7, further comprising: a tank, containing the purge gas, fluidly connected to the channel.

9. The assembly of claim 8, wherein the purge gas comprises:
- natural gas, synthetic natural gas, nitrogen, CO2, ambient air or combinations thereof.

10. The assembly of claim 8, wherein:

the tank is fluidly connected to the channel such that purge gas injected into the channel from the tank flows in a direction opposite to a direction that the product flows in the product delivery line.

11. A method of delivering a product, the method comprising:

providing a first pipe;

locating a product delivery line, configured to carry the product, in the first pipe and forming a channel between an exterior of the product delivery line and an interior of the first pipe;

locating a data system comprising at least one in-line hydrogen sensor within the channel to monitor for a presence and amount of a product in the channel at each hydrogen sensor; and configuring the channel such that the channel can be purged.

12. The method of claim 11, further comprising:

configuring the channel such that product that leaks from the product delivery line into the channel can be removed with a not significant amount of leaked product otherwise escaping from the channel into a space outside the first pipe.

13. The method of claim 11, further comprising: configuring the channel as a portion of a closed system isolated from a space outside the first pipe.

14. The method of claim 11, further comprising:

providing a first sensor configured to detect a first amount of product at a first location along the channel.

15. The method of claim 14, further comprising:

providing a second sensor configured to detect a second amount of product at a second location along the channel.

16. The method of claim 15, further comprising:

providing a monitoring system, in communication with the first and second sensors, configured to shut off a source of the product if at least one of the detected first and second amounts is greater than a predetermine threshold.

17. The method of claim 16, further comprising:

configuring the monitoring system to determine a location of the leak as a function of the detected first and second amounts.

18. The method of claim 11, further comprising removing product that leaks from the product delivery line into the channel by injecting a purge gas.

19. The method of claim 18, further comprising: providing a tank, containing the purge gas, fluidly connected to the channel.

20. The method of claim 19, wherein the purge gas comprises: natural gas, synthetic natural gas, nitrogen, CO2, ambient air, or combinations thereof.

21. The method of claim 19, further comprising:

fluidly coupling the tank to the channel such that purge gas injected into the channel from the tank flows in a direction opposite to a direction that the product flows in the product delivery line.

22. A method of delivering a product via a delivery assembly, the delivery assembly comprising:

a first pipe;

a product delivery line, configured to carry the product, disposed in the first pipe such that a channel is formed between an exterior of the product delivery line and an interior of the first pipe;

a data system comprising at least one in-line hydrogen sensor within the channel to monitor for a presence and amount of a product in the channel at each hydrogen sensor; and wherein the assembly is also configured to purge the channel, the method comprising:

injecting product into the product delivery line; and removing, via the channel, any product that leaks into the channel.

23. The method of claim 22, wherein the assembly is further configured such that product that leaks from the product delivery line into the channel can be removed with a not significant amount of leaked product otherwise escaping from the channel into a space outside the first pipe.

24. The method of claim 22, wherein the channel is a portion of a closed system isolated from a space outside the first pipe.

25. The method of claim 22, further comprising:

detecting, by a first sensor provided at a first location along the channel, a first amount of product in the channel.

26. The method of claim 25, further comprising:

detecting, by a second sensor provided at a second location along the channel, a second amount of product in the channel.

27. The method of claim 26, further comprising:

determining, by a monitoring system in communication with the first and second sensors, that at least one of the detected first and second amounts is greater than a predetermined threshold and shutting off a source of the product.

28. The method of claim 27, further comprising:

the monitoring system determining a location of the leak as a function of the detected first and second amounts.

29. The method of claim 22, wherein the assembly is further configured to remove product that leaks from the product delivery line into the channel by an injection of a purge gas.

30. The method of claim 29, further comprising:

providing a tank containing the purge gas; fluidly coupling the tank to the channel; and injecting purge gas from the tank into the channel.

31. The method of claim 30, wherein the purge gas comprises: natural gas, synthetic natural gas, nitrogen, CO2, ambient air, or combinations thereof.

32. The method of claim 30, further comprising:

fluidly coupling the tank to the channel such that purge gas injected into the channel from the tank flows in a direction opposite to a direction that the product flows in the product delivery line.

* * * * *